(12) United States Patent
Alipour et al.

(10) Patent No.: US 7,490,452 B2
(45) Date of Patent: Feb. 17, 2009

(54) METHOD AND APPARATUS FOR EVACUATING AND SEALING CONTAINERS

(75) Inventors: Ehsan Alipour, San Francisco, CA (US); Clinton Neal Slone, Mountain View, CA (US); William Gregory Tammen, Lafayette, CA (US); Thomas King, San Francisco, CA (US); Michael Strasser, Lafayette, CA (US); Benjamin Toru Mino, Chicago, IL (US)

(73) Assignee: Unovo, Inc., San Francisco, CA (US)

( * ) Notice: Subject to any disclaimer, the term of this patent is extended or adjusted under 35 U.S.C. 154(b) by 22 days.

(21) Appl. No.: 11/329,803

(22) Filed: Jan. 11, 2006

(65) Prior Publication Data

US 2006/0254219 A1     Nov. 16, 2006

Related U.S. Application Data

(60) Provisional application No. 60/643,183, filed on Jan. 12, 2005.

(51) Int. Cl.
*B65B 31/00* (2006.01)
(52) U.S. Cl. .......................................... 53/434; 53/405
(58) Field of Classification Search .................. 53/405, 53/408, 432, 433, 434, 512
See application file for complete search history.

(56) References Cited

U.S. PATENT DOCUMENTS

| | | | | |
|---|---|---|---|---|
| 2,387,812 | A | | 10/1945 | Sonneborn et al. |
| 2,649,234 | A | | 8/1953 | Taunton |
| 2,778,171 | A | | 1/1957 | Taunton |
| 2,778,173 | A | | 1/1957 | Taunton |
| 3,299,603 | A | | 1/1967 | Shaw |
| 3,382,642 | A | * | 5/1968 | Shaw ........................... 53/434 |
| 3,490,576 | A | | 1/1970 | Alessi et al. |
| 3,545,983 | A | * | 12/1970 | Woods ......................... 53/433 |
| 3,561,186 | A | * | 2/1971 | Pickering ..................... 53/434 |
| 3,716,961 | A | * | 2/1973 | Cope et al. ................... 53/434 |
| 3,745,024 | A | * | 7/1973 | Ford et al. .................... 53/512 |
| 4,294,859 | A | * | 10/1981 | Lundquist et al. ............. 53/434 |
| 4,777,782 | A | * | 10/1988 | Nixon et al. .................. 53/433 |
| 4,779,398 | A | * | 10/1988 | Glandon et al. ............... 53/434 |
| 5,048,269 | A | | 9/1991 | Deni |
| 5,287,680 | A | | 2/1994 | Lau |
| 5,386,678 | A | * | 2/1995 | Kujubu ........................ 53/434 |
| RE34,929 | E | | 5/1995 | Kristen |
| 5,655,357 | A | | 8/1997 | Kristen |
| 5,702,739 | A | * | 12/1997 | Owensby ..................... 53/434 |
| 5,765,608 | A | | 6/1998 | Kristen |
| 6,058,998 | A | | 5/2000 | Kristen |
| 6,256,968 | B1 | | 7/2001 | Kristen |
| 6,634,384 | B2 | | 10/2003 | Skeens et al. |
| 6,675,982 | B2 | | 1/2004 | Heil et al. |
| 6,789,690 | B2 | | 9/2004 | Nieh et al. |
| 6,821,099 | B2 | | 11/2004 | Wilk et al. |
| 2004/0084450 | A1 | | 5/2004 | Havens et al. |

(Continued)

*Primary Examiner*—Louis K Huynh
(74) *Attorney, Agent, or Firm*—Steven D. Hemminger

(57) ABSTRACT

An apparatus and method for creating a vacuum-sealed package comprising the placement of the item to be vacuum packed in a container; sealing the container, placing a portion of the container in contact with a sealable chamber; sealing the chamber, creating holes in the container, evacuating the desired amount of air from the container and creating a seal between the interior of the container and the holes.

5 Claims, 30 Drawing Sheets

U.S. PATENT DOCUMENTS

| | | |
|---|---|---|
| 2005/0013720 A1 | 1/2005 | Wilk et al. |
| 2005/0029704 A1 | 2/2005 | Wu et al. |
| 2005/0034806 A1 | 2/2005 | Wu et al. |
| 2005/0034807 A1 | 2/2005 | Wu et al. |
| 2005/0035020 A1 | 2/2005 | Wu et al. |
| 2005/0036717 A1 | 2/2005 | Wu et al. |
| 2005/0036718 A1 | 2/2005 | Wu et al. |
| 2005/0036719 A1 | 2/2005 | Wu et al. |
| 2005/0037163 A1 | 2/2005 | Wu et al. |
| 2005/0037164 A1 | 2/2005 | Wu et al. |
| 2005/0043158 A1 | 2/2005 | Wu et al. |
| 2005/0065007 A1 | 3/2005 | Wu et al. |
| 2005/0070412 A1 | 3/2005 | Wu et al. |
| 2005/0172577 A1* | 8/2005 | Oltrogge .................. 53/512 |
| 2006/0213148 A1* | 9/2006 | Baptista .................. 53/512 |

* cited by examiner

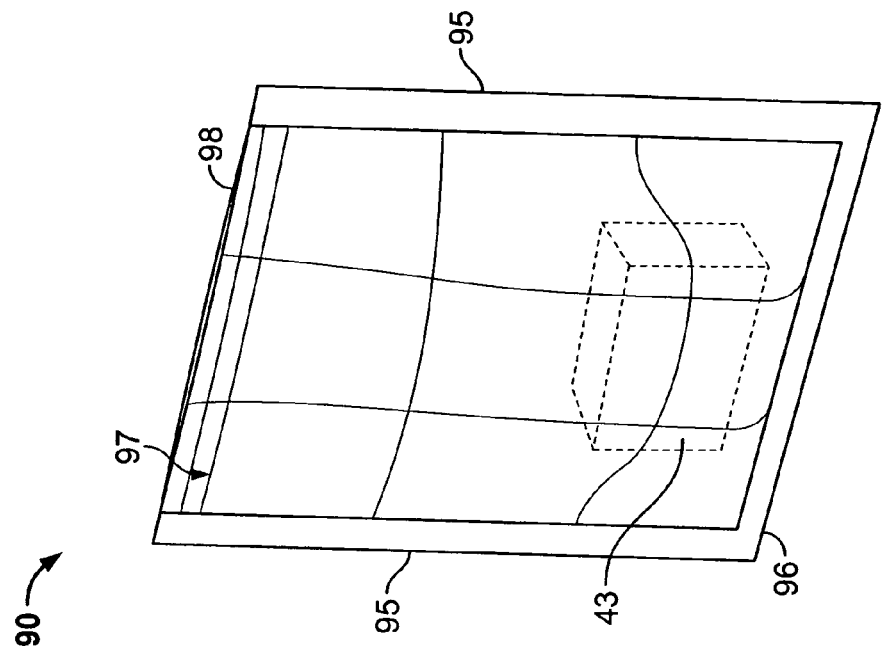
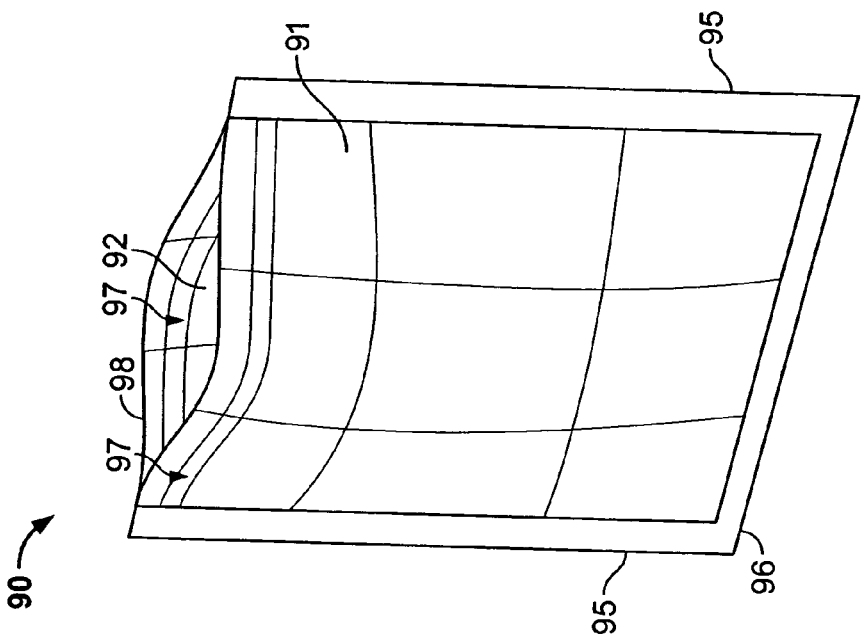

METHOD AND APPARATUS FOR EVACUATING AND SEALING CONTAINERS

CROSS-REFERENCE TO RELATED APPLICATIONS

This application claims priority to U.S. Provisional Application Ser. No. 60/643,183, entitled "Method and Apparatus for Air Removal and Sealing of Evacuable Bags" filed Jan. 12, 2005 which is hereby incorporated by reference in its entirety as if fully set forth herein.

BACKGROUND OF THE INVENTION

1. Field of the Invention

The present invention pertains to the field of evacuating and sealing containers, including methods and apparatus for removing fluid from a container and sealing the container.

2. Background

Consumers frequently use vacuum storage containers to preserve items in an environment from which all or most of the fluid in the container, typically air, has been removed. Storing food in a vacuum-sealed bag, for example, may help preserve flavor, may make food last longer, and may prevent freezer burn.

Items other than food can also be kept in vacuum storage bags or containers. Articles of clothing, flower seeds, matches, etc., stored in evacuated containers can be kept secure from external elements. Photos or other documents may also be protected and preserved.

Vacuum bags are also beneficial for compressible items. When air is removed from a bag in which a compressible item is placed, the stored item may be significantly compressed so that it is easier to transport and requires substantially less storage space.

Uses of the vacuum storage bags can be divided into two main categories: 1) single use vacuum storage bags and 2) multiple use vacuum storage bags. Single-use bags are typically used in industrial operations and in home kitchen use. For the industrial application, products are typically sealed in a vacuum pouch or bag for transport and storage. These vacuum pouches or bags are usually thrown away by the consumer after one use. While some industrial vacuum pouches now come with a resealable feature, the bags are meant to be thrown away when the consumer is finished with the contents and the pouches or bags are not vacuum-sealed again. For the home kitchen application, leftovers and other foodstuffs that have been opened are placed in a vacuum bag, sealed and the bag evacuated. When, for example, the leftover is going to be eaten, the vacuum bag is usually cut open to allow access to the contents. If the leftover is again not completely eaten, if it is to be saved, it will typically be placed in a new bag, which is sealed and evacuated.

Multiple-use vacuum storage bags are becoming more popular and are currently mainly used by consumers for storing items such as food or compressible household products (i.e., towels, pillows, etc) to save space.

Currently, most single use vacuum storage bags such as the Deni FRESHLOCK (U.S. Pat. No. 5,048,269 to Deni, et. al) evacuate air from the bag through the same opening through which the item is placed into the bag. Once the desired vacuum is created inside the bag, the bag is permanently sealed in that the bag must be cut open to access the item inside the bag. To accomplish the sealing, typical vacuum machines require extra material around the opening in which the item is inserted to allow for proper sealing. If the user wants to reuse the bag, air is evacuated through the newly cut opening and, if possible, permanently sealed again. However, the bag becomes smaller each time it is cut open, evacuated, and resealed. Eventually, the bag becomes too small and must be discarded. The result is a considerable waste of material and money. To have a truly reusable bag, it is desirable to be able to temporarily seal the opening through which the item is inserted and evacuate the bag from a different opening such as a valve on the side.

One type of known valve system is disclosed in U.S. Pat. No. 6,634,384 to Skeens et al. In the Skeens et al. system, a hole is placed in one side of the bag and a sturdy, one-way reusable valve is inserted and attached to the side of the bag. However, it is a plastic piece added to the bag not an integral piece of the bag itself, which requires additional manufacture, added bulk to the bag and expense. A disadvantage of this valve is that if the stem is accidentally depressed the seal to the bag will be broken causing undesirable spillage or the need to re-evacuate the bag.

Another drawback to the use of current vacuum storage bag systems is the cumbersome vacuum packaging apparatus used to evacuate air from the bags. Typical vacuum packaging apparatuses are designed such that they require a significant amount of table or counter space and are as wide as the bag opening. One such vacuum apparatus developed by Yen Lau, et al. (U.S. Pat. No. 5,287,680) addressed the size of the vacuum apparatus. The Yen Lau patent described a small hand held vacuum device that would close a bag having a resealable top except for a small part of the opening through which a vacuum nozzle was inserted. When the bag was sufficiently evacuated the nozzle would be removed. Unfortunately, air reenters the bag when the device is removed and the desired vacuum is lost as the remaining length of the bag is sealed by hand.

In addition, typical vacuum storage bag systems include heat sealers that may be limited in their ability to seal effectively or lack the ability to seal a wide variety of different bag styles, shapes and sizes. The devices designed to address this issue, for example, devices that use run through heat sealers that can accommodate different size bags are difficult to use reliably. If the user runs the sealer over the opening of the bag too quickly, a consistent vacuum type seal will not be formed. However, if the user runs the sealer too slowly, then the bag will melt. Other heat sealers that use rollers can have a bunching problem. If one of the rollers runs quicker than the other the bag can bunch in the corner, creating an incomplete seal.

On the industrial application side, the single use vacuum bag systems are quite cumbersome. U.S. Pat. No. 2,649,234, issued to Taunton, describes an early system for creating airtight packages. That system takes a pre-sealed bag and creates a slit in one of the side sheets. To accomplish this once the bag is placed in the system, suction is applied to the exterior of the bottom sheet of the bag to pull the bottom sheet away from the opposing top sheet. This creates a space between the top and bottom sheet to allow a piercing tool to pierce only the bottom sheet, leaving the non-pierced top sheet to maintain a seal to allow air to be evacuated from the bag. The area around the slit is then heat-sealed. The Taunton system is a very complex system. For example, in the Taunton system, the piercing tool must be adjusted properly to ensure that both the top and the bottom sheets are not pierced. In Taunton if the piercing tool is misadjusted and pierces both sheets, it would not be possible to evacuate the bag since Taunton relies on the top sheet to form part of the necessary seal during evacuation. Also in the Taunton system the bag material must be sufficiently compliant and consistent to reliably be able to create the appropriate air pocket between the top and bottom sheets.

For these and the following reasons, there is a need for a more compact, reusable method and apparatus for evacuating and sealing containers that address the foregoing disadvantages and problems.

OBJECTS AND ADVANTAGES

Several objects and advantages of the present invention include providing a method of evacuating a desired amount of air from a bag after all sides have been sealed; a method that requires a minimal amount of space on the bag surface to evacuate the bag to facilitate the reuse of the bag; and, a device that pairs any opening created in the bag to draw a vacuum with a permanent heat seal to minimize air seepage back into the evacuated bag.

Other objects and advantages include providing a compact/portable apparatus that does not require a large area in which to use the device or a large area in which to store the device. Still further objects and advantages will become apparent from a consideration of the ensuing detailed description and drawings.

SUMMARY OF THE INVENTION

Accordingly, a preferred embodiment of the present invention that addresses one or more of the above identified problems preferably comprises a main body, an opening mechanism, an evacuating mechanism, and a heat sealing mechanism.

A preferred method for creating a vacuum-sealed package comprises the placement of the item to be vacuum packed in a container; sealing the container, placing a portion of the container in contact with a sealable chamber; sealing the chamber, creating holes in the container, evacuating the desired amount of air from the container and creating a seal between the interior of the container and the holes.

Another preferred method for evacuating air from a vacuum bag begins with the placement of a vacuum bag between a base and an actuator of an apparatus. The actuator is closed down upon the vacuum bag so that the portion of the vacuum bag between the actuator and the base is in a sealable chamber isolated from the ambient air. The opening mechanism is activated to create a hole in the vacuum bag. The vacuuming mechanism is then activated to evacuate the air from the hole in the vacuum bag. When a sufficient vacuum is reached inside the bag, the heat-sealing mechanism is activated and seals the opening.

An alternative embodiment provides for the preferred embodiment further comprising an additional heat sealer feature. The additional heat sealer can work alone, independently of the preferred embodiment, or in combination with other mechanisms such as the preferred embodiment.

An alternative preferred method further comprises the steps of initially sealing the vacuum bag with the additional heat sealer. The user clamps the heat sealer across the opening of the vacuum bag. If the vacuum bag is wider than the width of the heat seal, the bag can be shifted and heat-sealed multiple times to seal the still open portions of the bag. After the vacuum bag has been completely sealed, the vacuum bag is inserted at the position of the vacuuming mechanism, and the preferred method is then applied to the bag.

BRIEF DESCRIPTION OF THE DRAWINGS

FIG. 7 is an isometric view of a bag that can be used with the preferred embodiment.

FIG. 8 is an isometric view of the bag of FIG. 7 with an item to be vacuum packed inserted in the bag.

DETAILED DESCRIPTION OF THE DRAWINGS

A preferred embodiment of aspects of the present inventions will be described in detail with reference to FIG. 1 to FIG. 6 below.

Figure 1:
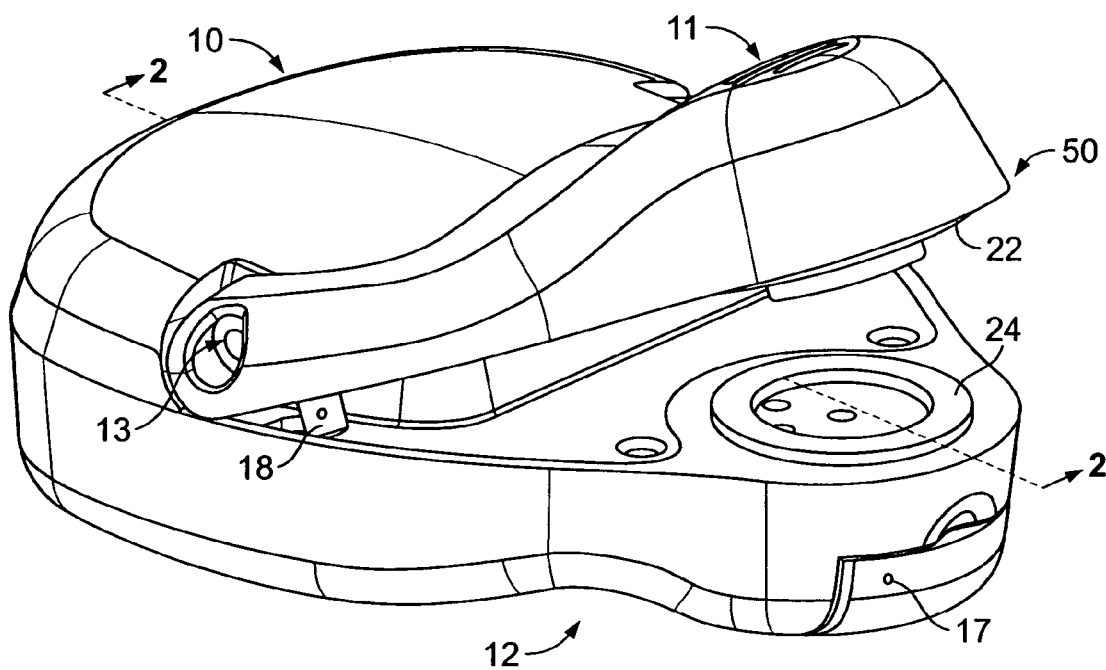
FIG. 1 is an isometric view of a preferred embodiment of the present invention when open.

FIG. 1 depicts a stand-alone evacu-sealer device 10 that preferably includes an evacu-sealer mechanism and a main body including a base 12 preferably connected to an actuator 11 via hinges 13. The actuator 11 is depicted in the open position. The base 12 preferably comprises an outer molded plastic housing. A drip tray 17 is preferably removably located in the base 12. The actuator 11 preferably includes a prong 18 to activate a lid switch 19 to detect when the actuator 11 is in the closed position.

Figure 2:
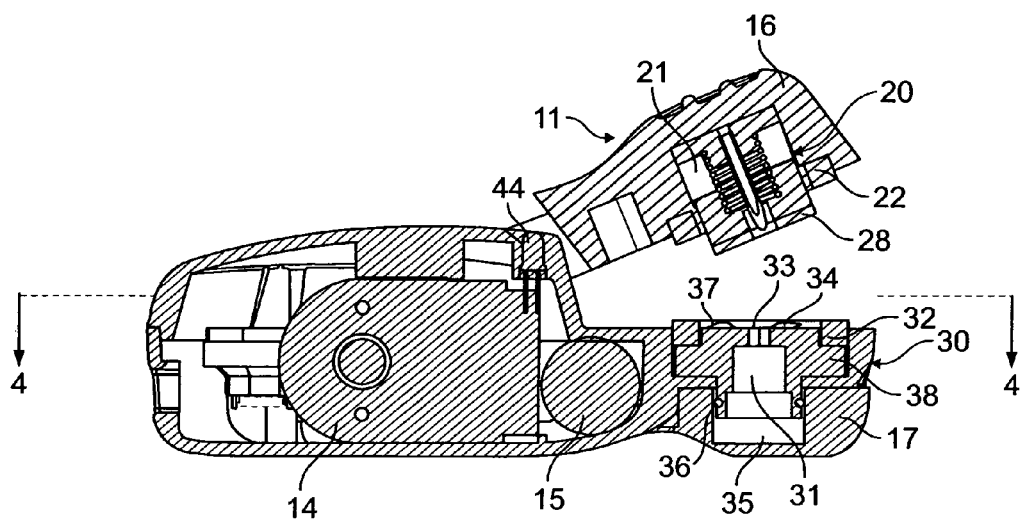
FIG. 2 is a section view along 2-2 of FIG. 1.

FIG. 2 is a cross-section of the stand-alone evacu-sealer device 10 of FIG. 1 taken along plane 2-2 of FIG. 1. As seen in FIG. 2 the preferred actuator 11 preferably includes an outer plastic housing 16 enclosing an upper sealing assembly 20. A vacuum pump 14, a power supply 15, and a lower sealing assembly 30 are preferably housed within the base 12. The vacuum pump 14 is indirectly connected to the power supply 15 through the lid switch 19. In one preferred embodiment the power supply 15 is comprised of batteries. The evacu-sealer mechanism 50 preferably comprises the upper sealing assembly 20 and the lower sealing assembly 30.

Figure 4:
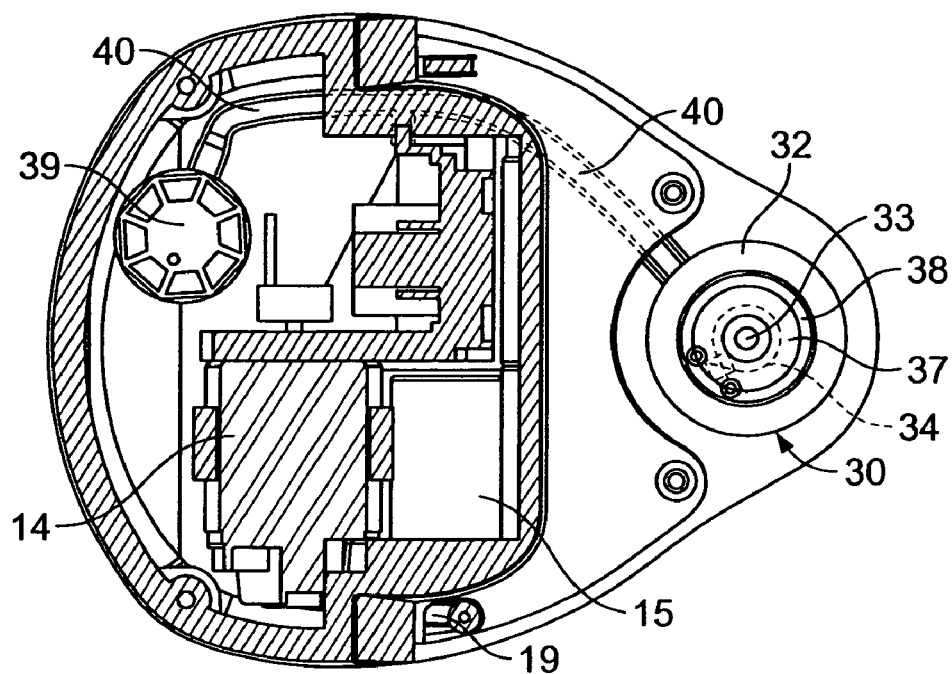
FIG. 4 is a section view along 4-4 of FIG. 2.

The lower sealing assembly 30 preferably includes a heating assembly, a lower gasket 32, and a heater block 38. The heater block 38 forms a lower vacuum chamber 31. As best seen in FIG. 4, the heating assembly preferably includes a heating element 34, and insulator 37 attached to the heater block 38. Preferably the heating element 34 is a high resistance flexible thermal wire and the insulator 37 is a thermal insulating tape. The drip tray 17 preferably forms the bottom portion of the lower sealing assembly 30. The drip tray 17 is preferably attached to the heater block 38 by a drip tray O-ring 36 and preferably includes a cylindrical reservoir 35 in fluid communication with the lower vacuum chamber 31. The drip tray O-ring 36 creates a seal between the heater block 38 and the drip tray 17 so that a vacuum can be maintained when the drip tray is attached. The heater block 38 preferably includes a vacuum port 33 in direct fluid communication with the lower vacuum chamber 31, which is in direct communication with the drip tray circular reservoir 35. The drip tray cylindrical reservoir 35 is designed to catch any liquid drawn into the sealing assembly while evacuating a bag. As explained in conjunction with FIG. 6A below, the drip tray 17 is preferably designed to catch liquid whether the evacu-sealer is vertical or horizontal.

Figure 3:
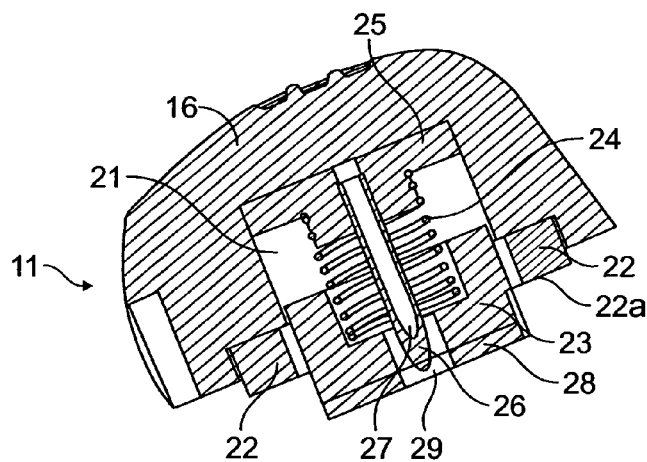
FIG. 3 is a detail view of the upper chamber from FIG. 2.

FIG. 3 is a detailed view of a preferred upper sealing assembly 20 showing an upper vacuum chamber 21, an upper gasket 22, a sealer plate 23, a spring 24, a spring/blade mount 25, and a blade 26 with an air channel 27. The upper gasket 22 preferably encircles the sealer plate 23 and has an upper gasket sealing face 22a. The blade 26 and spring 24 are preferably secured to the spring/blade mount 25 by a press fit. The tip of the blade 26 extends beyond the plane defined by the upper gasket sealing face 22. The sealer plate 23 preferably has a heat sealer pressure pad 28 attached to one end and is preferably cup shaped to capture one end of the spring 24. The sealer plate 23 and the attached heat sealer pressure pad 28 include a central opening 29 to allow the sealer plate 23 and heat sealer pressure pad 28 to retract, exposing the blade 26 and facilitating evacuation of the fluid from the container. The sealer plate 23 is attached such that when the spring 24 is in the relaxed position, the plane of the heat sealer pressure pad 28 extends sufficiently beyond the tip of the blade 26 to minimize the possibility of the user accidentally puncturing or cutting themselves on the blade 26. The spring/blade mount 23, spring 24, blade 26 and sealer plate 23 are assembled such that when the actuator 11 is in the closed position the blade 26 extends through the central opening of the sealer plate 23 and sealer pressure pad 28 as the spring 24 is compressed. The air channel 27 is preferably located within the blade 26. In the preferred embodiment, the blade 26 is shaped so that it creates a semi-circular cut and allows for air or fluid to flow around the blade 26 and through the air channel 27 while still engaged with the container. The blade 26 may have different shapes or configurations to cut through the walls of a container while still allowing for fluid flow from the interior of the container into the upper vacuum chamber. The blade may for example be a flat blade (not shown) or two perpendicular blades (not shown).

FIG. 4 is a top view of the evacu-sealer device of FIG. 1 taken along plane 4-4 of FIG. 2. When the actuator 11 is in the closed position, lid switch activator 18 depresses lid switch 19, which activates the vacuum pump 14. The vacuum pump 14 is connected to the lower vacuum chamber 31 and vacuum port 33 via a vacuum hose 40. The vacuum hose 40 preferably communicates with the lower vacuum chamber 31 close to the top of the lower vacuum chamber 31. During operation, when sufficient air has been removed from the container, vacuum pressure switch 39 causes the sealing process to begin.

Figure 5:
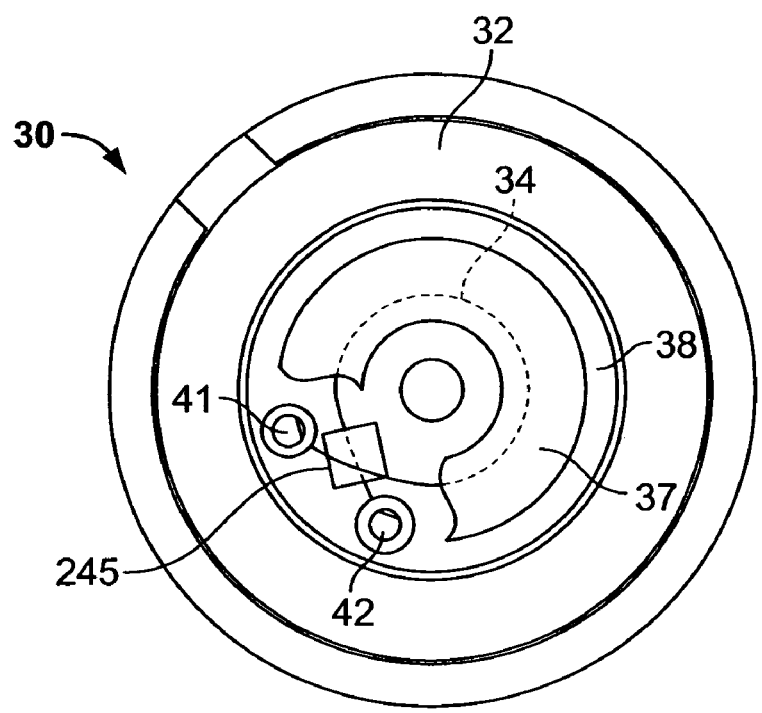
FIG. 5 is an enlarged top view of the lower sealing assembly of FIG. 2.

FIG. 5 is an enlarged view of the lower sealing assembly 30. As shown in FIG. 5 the heating element 34 is secured to the heating block 38 by screw terminals 41 and 42 and insulator 37. To ensure that the seal on the container is complete, in this embodiment the heating element wire is wound in a loop shape and crosses over itself. To avoid electrical shorting an intersection insulator 245 is placed between the crossed ends of the heating element near the terminals. The insulator 37 serves to not only cover the entire heating element 34 but also to hold the element 34 in place.

Figure 6:
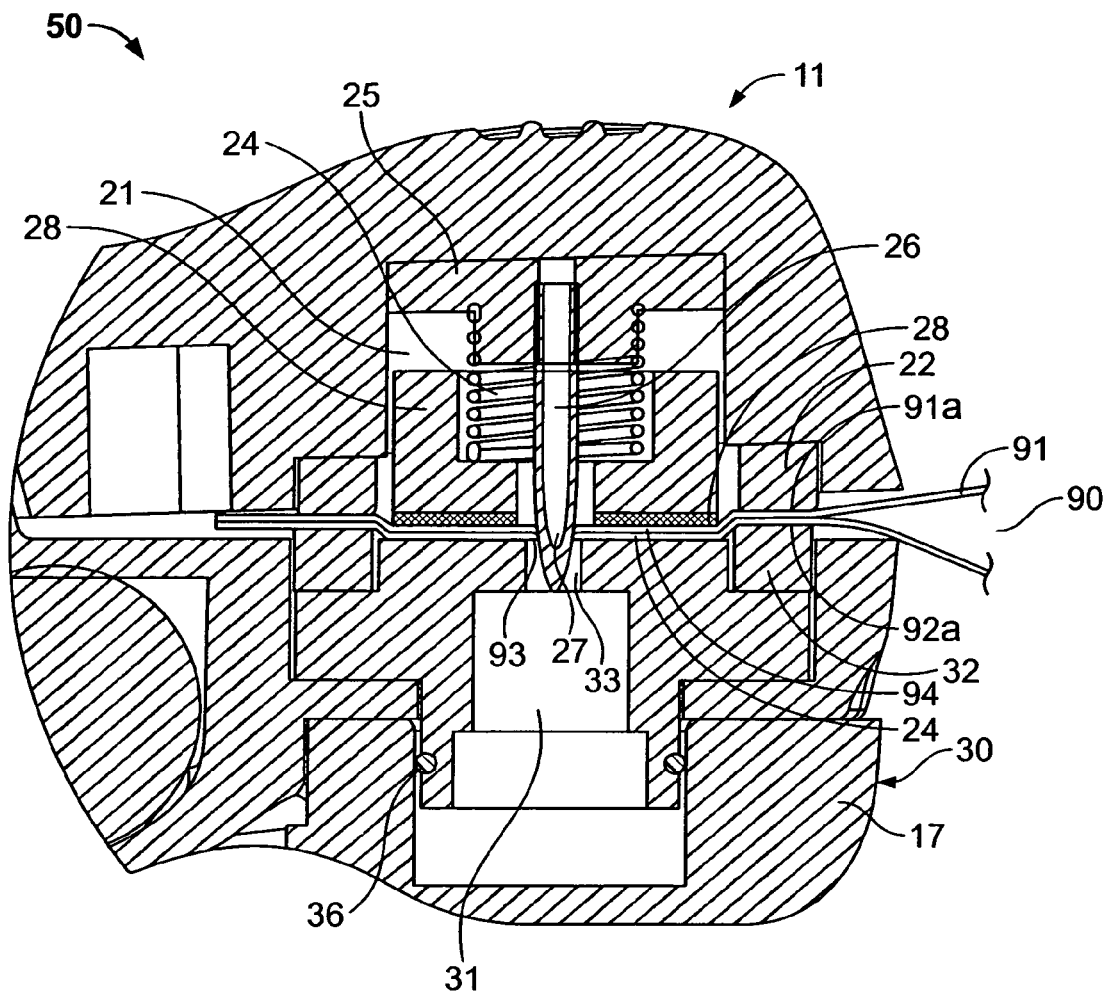
FIG. 6 is a section of the evacu-sealer mechanism when closed, with a bag inserted.

FIG. 6 shows a cross section of the preferred evacu-sealer mechanism 50 of the stand-alone evacu-sealer device 10 depicted in FIG. 1 with the actuator in the closed position and with a bag 90 positioned between the upper gasket 22 and lower gasket 32. In the closed position, the upper gasket 22 creates a seal with the exterior surface 91a of a first side 91 of the bag 90 and the lower gasket 32 creates a seal with the exterior surface 92a of a second side of bag 90, creating two sealed chambers, in which a portion of the surfaces of the sides of the bag 90 are isolated from the ambient air. In the closed position the blade 26 cuts through both the first side 91 and the second side 92 of the bag 90, creating a cut 93 in the bag 90. In the preferred embodiment, as the cut 93 is created, the tip of the blade 26 extends into the vacuum port 33. However, it is not necessary that the blade 26 extend into the vacuum port 33, only that it cuts both sides of the bag 90. The cut 93 provides fluid communication between the upper vacuum chamber 21 and the lower vacuum chamber 31 and provides an opening through which air in the bag 90 may be removed. When the vacuum pump 14 is activated, a lower than ambient pressure is created in the upper vacuum chamber 21 and the lower vacuum chamber 31 causing air in the bag 90 to be evacuated through the cut 93 facilitated by the air channel 27.

Figure 6A:
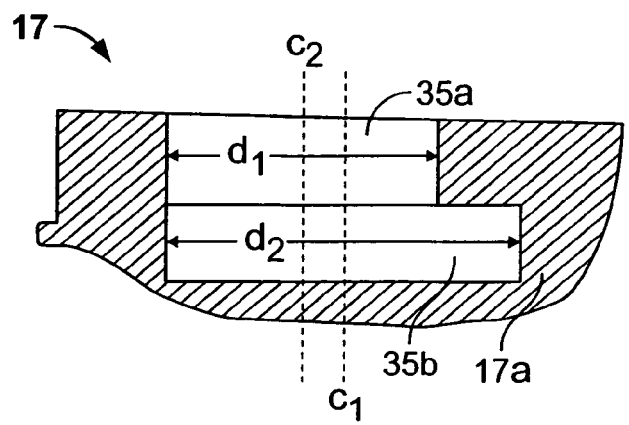
FIG. 6A is a section view of an alternative embodiment of the drip chamber 17.

Since the vacuum hose 40 communicates with the lower vacuum chamber 31 near the top of the lower vacuum chamber 31, if liquid in addition to air is evacuated from the bag 90, the liquid will drop through the lower vacuum chamber and collect in the bottom of the drip chamber 17 when the evacu-sealer device 10 is operated horizontally (the depicted orientation), for example on a kitchen counter-top, with the actuator 11 on top and the base 12 on the bottom. This minimizes the drawing of liquid through the vacuum hose 40. Also, the depicted preferred embodiment includes a lower vacuum chamber 31 and drip chamber 17 configuration that allows the stand-alone evacu-sealer device 10 to collect evacuated liquid in the drip chamber 17 when the stand-alone evacu-sealer device 10 is operated vertically, e.g., when the stand-alone evacu-sealer device 10 is mounted on a wall, with the evacu-sealer mechanism 50 end of the stand-alone evacu-sealer device 10 on the bottom. This is preferably accomplished by having the lower vacuum chamber 31 and the drip chamber 17 assembly have a generally conical shape with the top of the lower vacuum chamber 31 being the tapered end of the cone. (not shown) Alternatively one end of the drip chamber 17 can include an undercut below the drip tray o-ring 36. As shown in FIG. 6A the undercut is preferably achieved by a drip tray 17 having an upper cylindrical reservoir 35a with a diameter d1 and lower cylindrical reservoir 35b with a diameter d2 and offsetting the centerlines C2 and C1 of the upper and lower cylindrical reservoirs towards the nose 17a of the drip chamber 17.

Also occurring while the actuator 11 is in the closed position is the compression of the spring 24. When the spring 24 is compressed, in addition to exposing the tip of the blade 26, the spring 24 initially presses the heat sealer pressure pad 28 against the exterior surface 91a of the first side 91 of the bag 90. However, the pressure is not too great to prevent the air in the bag 90 from passing between the interior surface of the top later 91 and the interior surface of the bottom side 92 to evacuate the air from the bag 90. In a preferred embodiment, once sufficient air has been evacuated from the bag 90 the sealer plate 23 and heat sealing pressure pad 28 are pulled down creating more pressure on the exterior surface 91a of the first side 91 to facilitate sealing. As discussed more fully below, once the desired amount of air is evacuated from the bag 90, the heating element 34 is activated, causing the first side 91 and second side 92 to fuse forming a seal 94 between the cut 93 and the contents of the bag 90 resulting in a heat sealed vacuum package.

Operation

While using the preferred apparatus, the bag preferably includes air channels on the inner surfaces of the sides of the bag such as those sold under the Tilia™ brand. When the actuator 11 is in the closed position, the air channels facilitate the passage of the air between the upper gasket 22 and the lower gasket 32 and into the chambers. However, the preferred embodiment may be used with other bags, such as household Ziploc® bags that do not include air channels. An example of a preferred reclosable bag 90 is depicted in FIG. 7. The bag has an open top edge 98 and is preferably formed from either two sheets of material that are sealed along the side edges and the bottom edge or a single sheet that is folded resulting in sealed side edges and a fold along the bottom edge 96.

The resulting bag 90 includes a first side 91 and a second side 92. The first and second sides each comprise an interior surface and an exterior surface. The first and second sides may be comprised of one or more layers of the same or a different material and, as noted above, may or may not have air channels or grooves on the interior surfaces. The material on the interior surfaces of the bag, however, must be capable of being sealed together by the application of heat. The seals along the edges 95, 96 should be airtight in that leakage of air through the seal is not greater than the leakage of air through the material forming the sides. Preferably the open top edge 98 of the bag 90 includes a re-closing mechanism 97 such as for example the mechanism found on Ziploc® bags, to allow the bag to be opened and closed more than once.

A preferred method for forming a vacuum package comprises re-sealably sealing an item in a container, evacuating the container and sealing the evacuated container. A preferred process for re-sealably sealing an item in a container comprises, obtaining a reclosable container, placing the item 43 to be packaged into the container and re-sealably sealing the container. FIG. 8 is an example of an item 43 sealed in a reclosable bag 90. In this embodiment, the item 43 is placed in the bag and the re-closable mechanism 97 is used to seal the top edge 98.

Once an item is re-sealably sealed inside the container the evacuation process can begin. A cut is made through two sides of the container and the desired volume of air is evacuated from the container. Once the desired volume of air is evacuated, an airtight seal is formed between the cut and the rest of the interior of the container. An "airtight seal" is a seal that provides the desired minimum leakage of air or fluid into the container.

Figure 9:
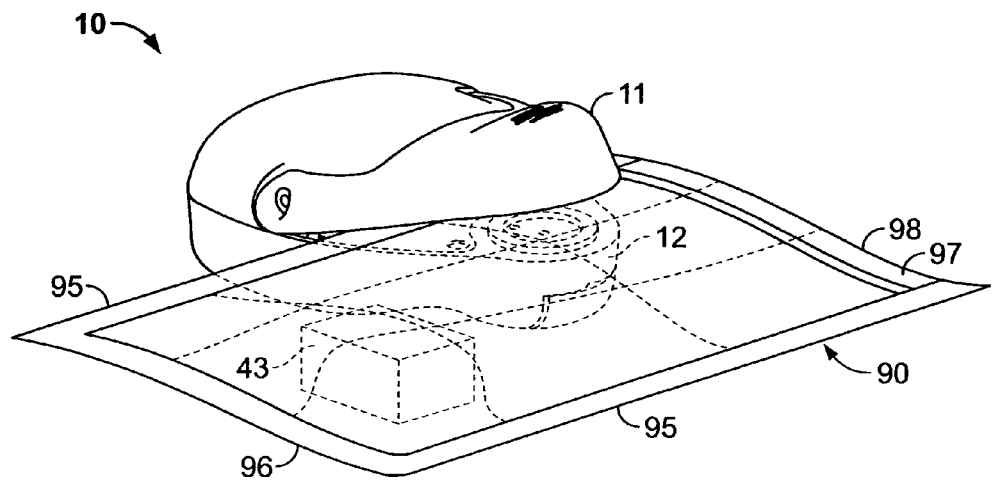
FIG. 9 is an isometric view of a preferred embodiment of the present invention with the bag and item of FIG. 8.
Figure 10:
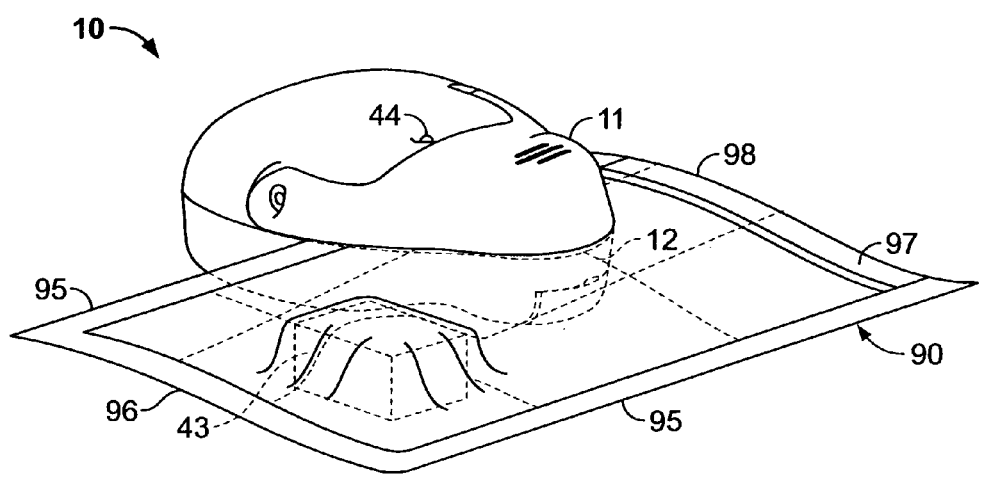
FIG. 10 is an isometric view of a preferred embodiment with a bag in the closed position.

An example of a preferred evacuation process is depicted in FIGS. 9 and 10. If a reclosable bag and the stand-alone evacu-sealer device 10 are used, with the actuator 11 in the open position, a free portion of a pre-sealed reclosable bag 90 is placed between the actuator 11 and the base 12. Preferably the free portion of the bag 90 is a portion where the interior surface of the first side can directly abut the interior surface of the second side so that an airtight seal may be made between the two surfaces.

The actuator 11 is moved to the closed position. As the actuator 11 is moved to the closed position, the blade 26 is exposed and pierces both sides 91, 92 of the bag 90 forming a cut 93 (See e.g., FIG. 6). As the spring 24 compresses when the actuator 11 is moved to the closed position, the spring 24 presses the sealer plate 13 down against the vacuum port heat sealer 24. Also, the exterior surfaces 91a, 92a of the bag 90 are pressed tightly, as previously described, by the upper gasket 22 to form an airtight seal with the exterior surface of the first side 91a, and the lower gasket 12 to form an airtight seal with the exterior surface of the second side 92a of the bag 90. When the actuator is in the closed position with a the free portion of the bag positioned between the upper gasket 22 and the lower gasket 32, the upper vacuum chamber 21 and lower vacuum chamber 31 are sealed and connected to each other through the air channel 27, the cut 93 and the vacuum port 33.

As the actuator is moved to the closed position, the lid switch actuator 18 activates the lid switch 19, turning on the vacuum pump 14. In this method the actuator is biased in the open position so the user must hold the actuator 11 in the closed position through out the evacuation process since releasing the actuator 11 will cause the actuator to move to the open position and the lid switch actuator 18 will no longer engage the lid switch 19 causing the vacuum pump 14 to turn off. In other preferred methods, actuator 11 will temporarily latch into place and automatically be released at the end of the evacuation and sealing processes. As air is evacuated by the vacuum pump 14, the air will exit from the bag through the cut 93 and travel through the vacuum port 33, lower vacuum chamber 31 and the vacuum hose. The evacuated air may be vented through the cracks and seams of the base 12 or preferably through a molded in grating in the plastic housing forming the base 12. When a sufficient vacuum is reached inside the bag 90, the vacuum switch 39 will trigger the sealing process.

If any liquid is evacuated during the evacuation process, the liquid will pass through the lower vacuum chamber 31 into the drip tray reservoir 35. If the drip tray reservoir 35 should become full, the drip tray 17 may be removed after the sealing process and the liquid discarded.

A preferred sealing process comprises forming a seal between the cut in the container and the interior of the container, preferably by thermally fusing the two sides of the container together around the cut. In the presently preferred method, immediately after the bag is sufficiently evacuated the sealing process begins. After the pressure vacuum switch 39 is activated by the preset amount of vacuum, the heating element 34 is turned on. In an alternative embodiment, the sealer can be activated at any point of the evacuation process to prevent crushable items in the container from being crushed. Preferably the vacuum pump 14 maintains a vacuum during the sealing process. This helps ensure that air does not re-enter the bag 90 but also assists with sealing since the low pressure between the interior surfaces of the sides of the bag combined with the bias caused by the spring 24 putting pressure on the exterior surface of the bag through the heat sealer pressure pad 18 facilitates the fusion of the material comprising the two sides. The heat-sealing mechanism preferably keeps the heating element 34 on for a predetermined amount of time. After the predetermined amount of time has elapsed, the bag 90 will have an airtight seal between the cut 93 and the interior of the bag. The heater element 34 and the vacuum pump 4 will shut off. The actuator 11 can be moved to the open position and the bag 90 that has been evacuated can be removed.

Preferably feedback for the operational sequence is provided by an indicator light 44, preferably a red LED, on the actuator 11. For example, the indicator light 44 blinks during the evacuation process, is constantly on during the sealing process and shuts off when the container is sealed, isolating the cut from the rest of the container.

Figure 11:
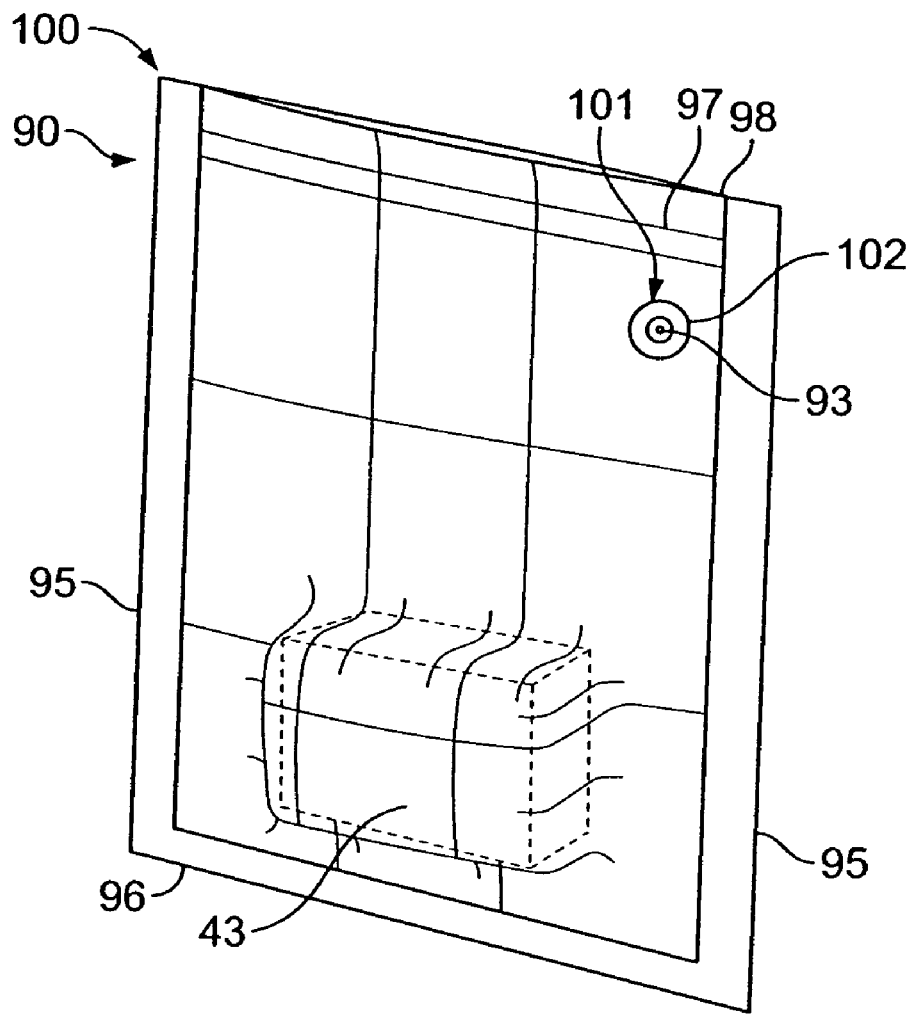
FIG. 11 is an isometric view of a vacuum-sealed package.

FIG. 11 depicts a reusable vacuum package 100 according to aspects of the present invention. The item 43 is sealed in the bag 90 and the desired amount of fluid, preferably air, has been removed. The side edges 95 and bottom edge of the bag 90 are permanently sealed and the top edge 98 is sealed with the re-closing mechanism 97. In this embodiment, the vacuum package includes a donut seal 101. It is understood that other closed geometric shape seal configuration may be used such as a square, triangle, octagon, etc. The donut seal 101 in this embodiment includes a circular thermal seal 102 surrounding the cut 93.

Figure 11A:
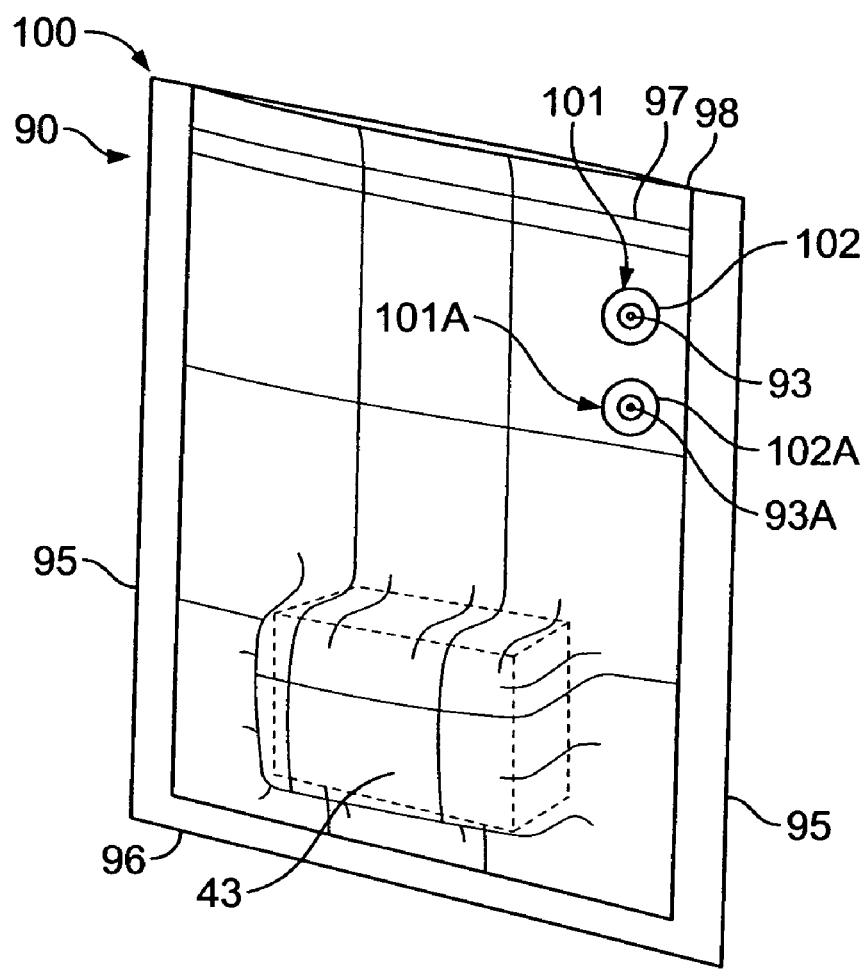
FIG. 11A is an isometric view of reclosable vacuum-sealed package that has been opened and vacuum-sealed a second time.

FIG. 11A depicts a reusable vacuum package 100A wherein the processes of re-sealably sealing an item in a container, evacuating the container and sealing the container has been performed once and the user opens the bag 100 to retrieve the item 43 and then the processes of re-sealably sealing the same or a different item in a container, evacuating the container and sealing the container are repeated. A reusable vacuum package 100A that has been reused will have at least two donut seals 93 and 93A. Every time the reusable vacuum package is opened and resealed, the resulting reusable vacuum package will include an additional donut seal. Preferably the additional donut seals will be positioned around the periphery of the bag or other locations to minimize loss of storage volume in the bag due to the donut seal.

Alternative Embodiments

Figure 12:
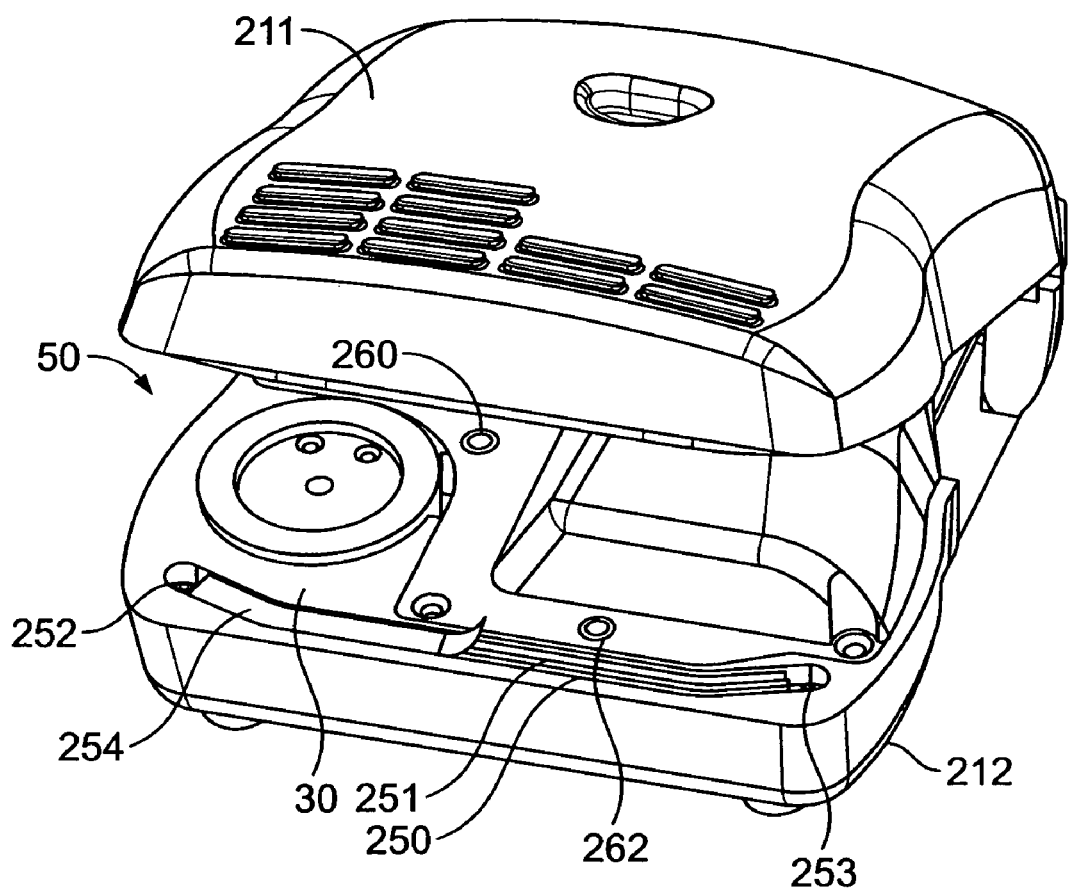
FIG. 12 is an isometric view of an embodiment of the present invention with a bag sealer in the open position.
Figure 13:
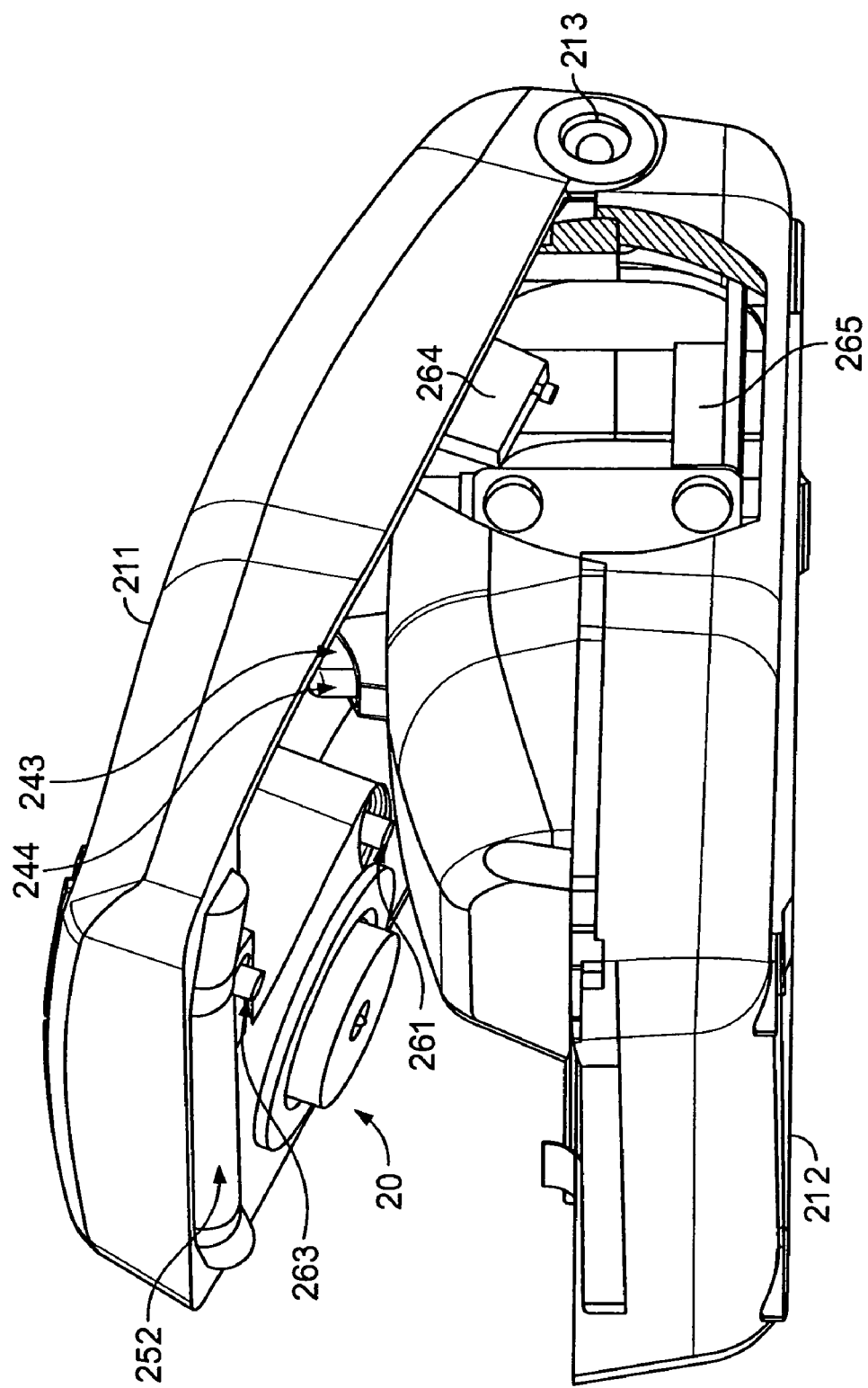
FIG. 13 is an isometric view of the interior of the embodiment of FIG. 12 in the open position.

FIGS. 12 and 13 are different perspective views of embodiments of other aspects of the present invention. This embodiment includes a bag sealer feature in combination with a modified actuator, upper sealing assembly and lower sealing assembly as described with regard to the presently preferred embodiment depicted in FIG. 1.

The multi-function evacu-sealer device 200 can perform the function of first heat sealing a container containing an item, evacuating the container and sealing the evacuated container. The multi-function evacu-sealer device 200 preferably includes a multi-function actuator 211 and a multi-function base 212 pivotally connected via hinge assembly 213 to the multi-function actuator 211. The multi-function evacu-sealer device 200 also includes an evacu-sealer mechanism 50 which preferably comprises an upper sealing assembly 20, a lower sealing assembly 30 and a power supply 15, vacuum pump 14, vacuum hose 40 and vacuum pressure switch 39 as described best in connection with FIGS. 1-5. These components may be physically modified to the extent necessary to fit within the multi-function base 212 and multi-function actuator 211, but function in the same manner as previously described.

The multi-function evacu-sealer device 200 includes a bag sealer assembly 250 that preferably includes a bag seal element 251 and a bag insulator 254 incorporated in the multi-function base 212. The bag sealer assembly 250 also preferably includes a bag sealer pressure strip 255 preferably attached to the multi-function actuator 211 such that it is aligned with the bag sealer element 251 when the multi-function actuator is in the closed position. The bag sealer pressure strip 255 is preferably made of a relatively durable rubber and formed into a semi-circular strip.

The bag sealer element 251 is preferably a heat seal wire preferably with a non-linear configuration as will be described more fully below. The bag sealer element 251 is preferably fixed into place by screw terminals 252, 253. The bag insulator 254 is preferably a strip of insulating tape. The bag insulator 254, which for purposes of illustration is depicted as only covering a portion of the bag sealer element 251, preferably covers the entire length of the bag sealer element 251 and preferably serves to insulate as well as hold the bag sealer element 251 in place.

The multi-function evacu-sealer device 200 also preferably includes function sensors that may be used to automatically actuate the devices various functions under certain conditions. The function sensors preferably include a multi-function actuator position sensor, a bag sealer position sensor 260, a bag sealer actuator 261, a vacuum sealer position sensor 262 and a vacuum sealer actuator 263. Preferably the bag sealer actuator 261 opposes the bag sealer position sensor 260. The bag sealer actuator 260 and bag sealer position sensor 261 operate to activate or deactivate the bag sealer assembly 250. Preferably, the vacuum sealer actuator 263 opposes the vacuum sealer position sensor 262. The vacuum sealer position sensor 262 and vacuum sealer actuator 263 operate to activate or deactivate the evacu-sealer mechanism 50.

The multi-function actuator position sensor preferably comprises a lid switch actuator 264 and a lid switch 265 which effectively function as an on/off switch. In the presently preferred embodiment of the multi-function evacu-sealer 200, the multi-function actuator 211 is normally in the open position. In the open position the lid switch 265 is "off"

and no power flows to the components of the device. When the multi-function actuator 211 is in the closed position, the lid switch actuator 264 turns the lid switch 265 "on" providing power to the components of the device.

Operation—Alternative Embodiment

Figure 14:
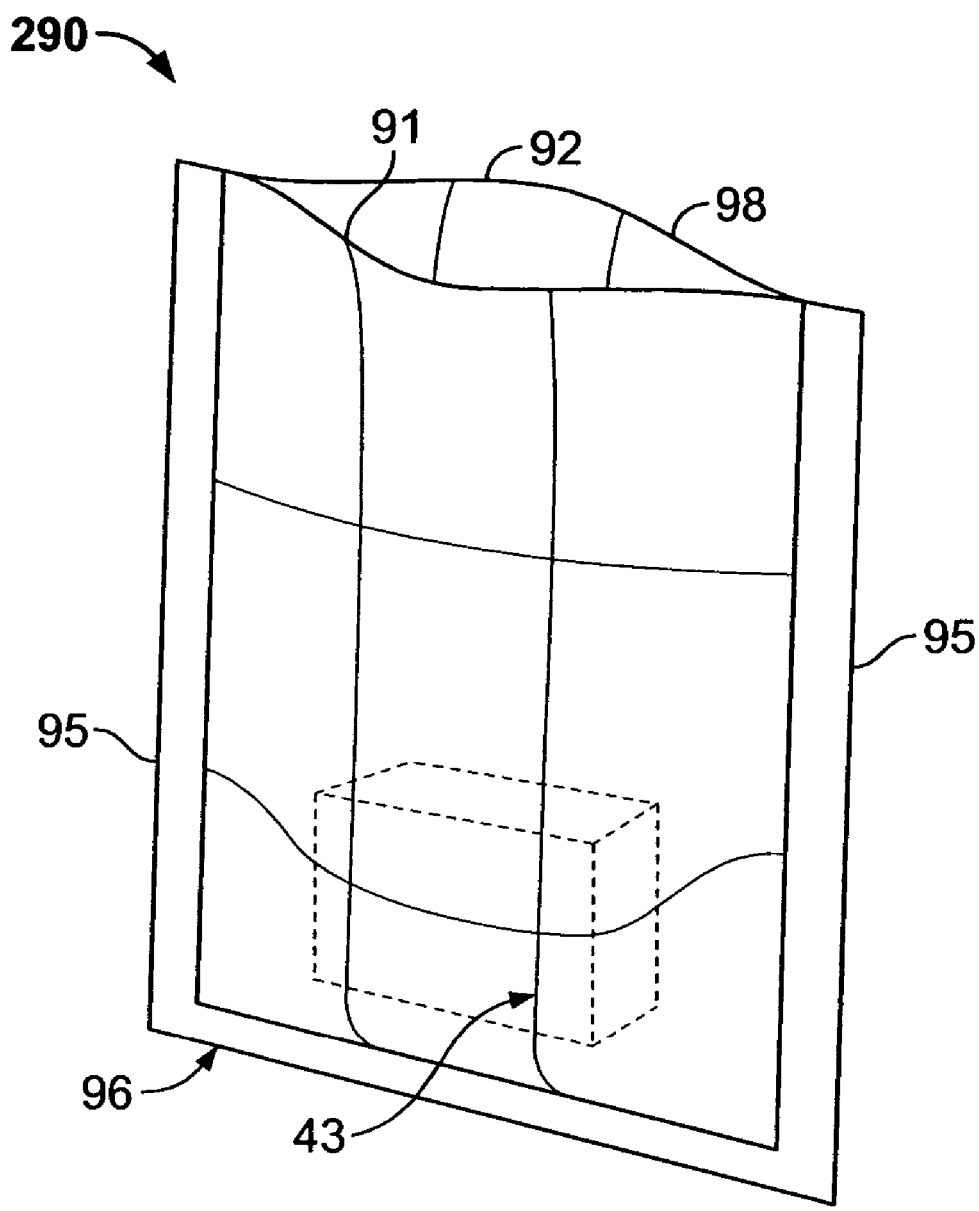
FIG. 14 is an isometric view of a preferred bag for use with the embodiment of FIG. 12 with an item to be vacuum-packed inside.
Figure 15:
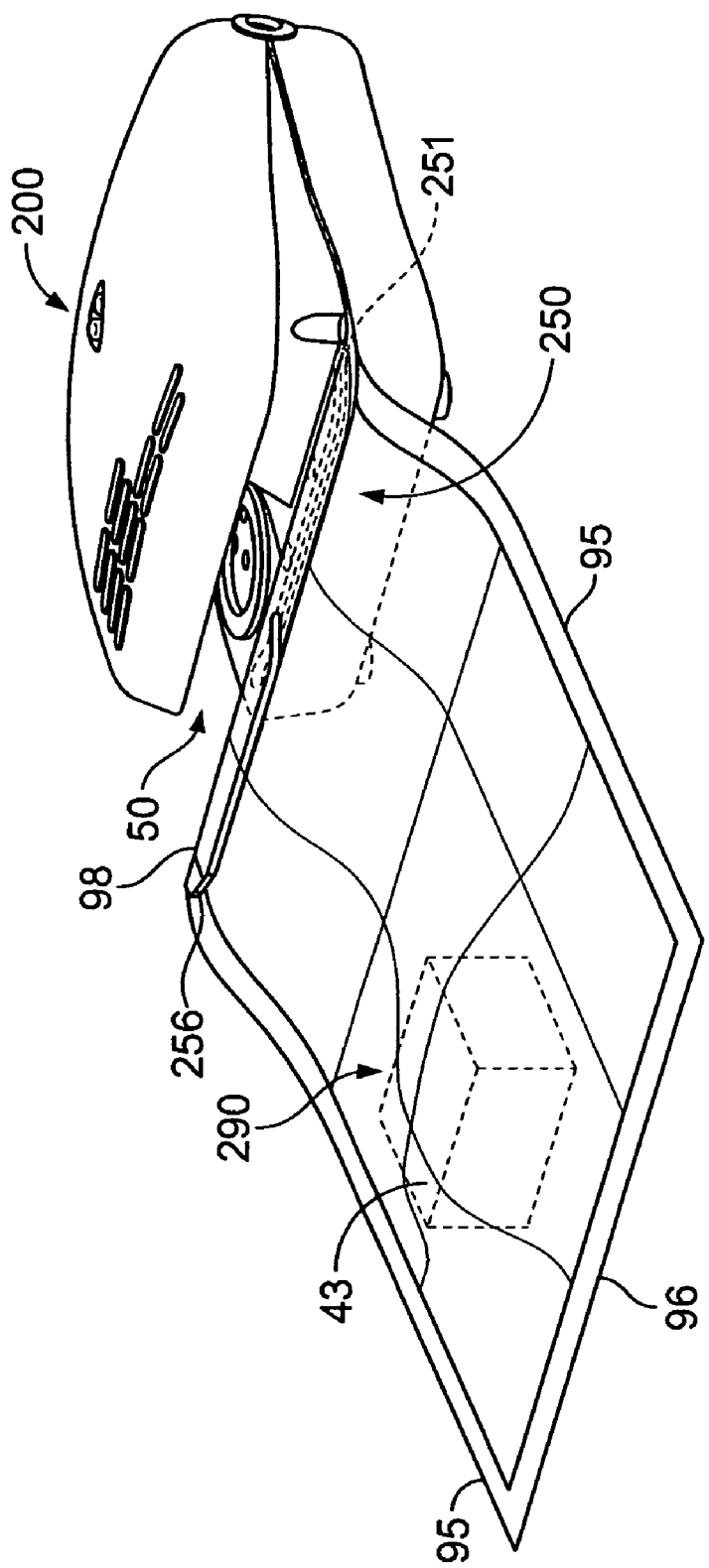
FIG. 15 is an isometric view of the bag and item of FIG. 14 in position to seal the bag using the FIG. 12 embodiment.

The multi-function evacu-sealer 200 can be used in the same way as the stand-alone evacu-sealer 10 with the added feature that it can be used with non-reclosable bags that require heat sealing without the need for a separate bag sealer. When the user uses a reusable bag 90 that can be sealed without heat sealing, whether or not it is reclosable, the stand-alone evacu-sealer device 10 can be used since it is not necessary to have a heat sealer to seal the bag opening after the item is placed in side the bag. However, when you have a non-reclosable bag 290 as depicted in FIG. 14, the non-reclosable bag 290 must be heat sealed after the item is placed in the non-reclosable bag 290.

Another preferred method for forming a vacuum package comprises heat sealing an item in a container, evacuating the fluid from the container and sealing the evacuated container. Preferably the method is performed using the multi-function evacu-sealer 200 although the method could be performed by first heat sealing the bag and then using the stand-alone evacu-sealer 10 as described above.

A preferred method of heat-sealing an item in a bag comprises, obtaining a non-reclosable bag 290 that is sealed along three edges 95, 96 and has an open top edge 98 a first and second side 91, 92. As with the bag 90 depicted in FIG. 7 and as described above, the bag 290 may be made from two sheets or a single folded sheet, may have air channels on the interior surfaces of the sides and the sides 91, 92, and may be made from one or more layers of the same or different materials. The material on the interior surfaces, however, must be capable of being sealed together by the application of heat. Unlike the bag 90 depicted in FIG. 7, the bag 290 depicted in FIG. 14 does not include a reclosable mechanism 97.

Once the item to be vacuum packed is place in the bag 290, the bag 290 must be sealed. This bag sealing process is preferably accomplished first by placing the open top end 98 of the bag 290 between the heat sealer pressure strip 255 and the bag sealer element 251. The actuator 211 is moved to the closed position and held in the closed position, securing the bag 290 tightly between the bag sealer pressure strip 255 and the bag sealer element 251.

When the actuator 211 is moved to the closed position, the lid switch actuator 264, which opposes the lid switch 265, will press down upon the lid switch 265. The lid switch 265 will then activate either the bag sealer element 251 or the evacu-sealer mechanism 50. The bag sealer position sensor 260 and the vacuum sealer position sensor 262 will sense whether the bag 290 is positioned by the bag sealer assembly 250 or by the evacu-sealer mechanism 50. In the preferred embodiment, when the bag 290 is placed between the bag sealer element 251 and the bag sealer pressure strip 255, the bag sealer actuator 261 contacts the bag sealer position sensor 260 causing the bag sealer element 251 to be activated. The bag sealer assembly 250 will preferably seal for a predetermined amount of time. The bag sealer indicator light 243, preferably a red LED, will indicate that the bag sealing assembly 250 is sealing and when the predetermined time has elapsed, to inform the user when the actuator 211 may be moved to the open position. The bag sealer indicator light 243 will preferably be on when the bag sealer assembly 250 is sealing and turn off when the multi-function actuator 211 may be moved to the open position. After moving the multi-function actuator 211 to the open position bag 290 will then have a first bag seal 256.

Figure 16:
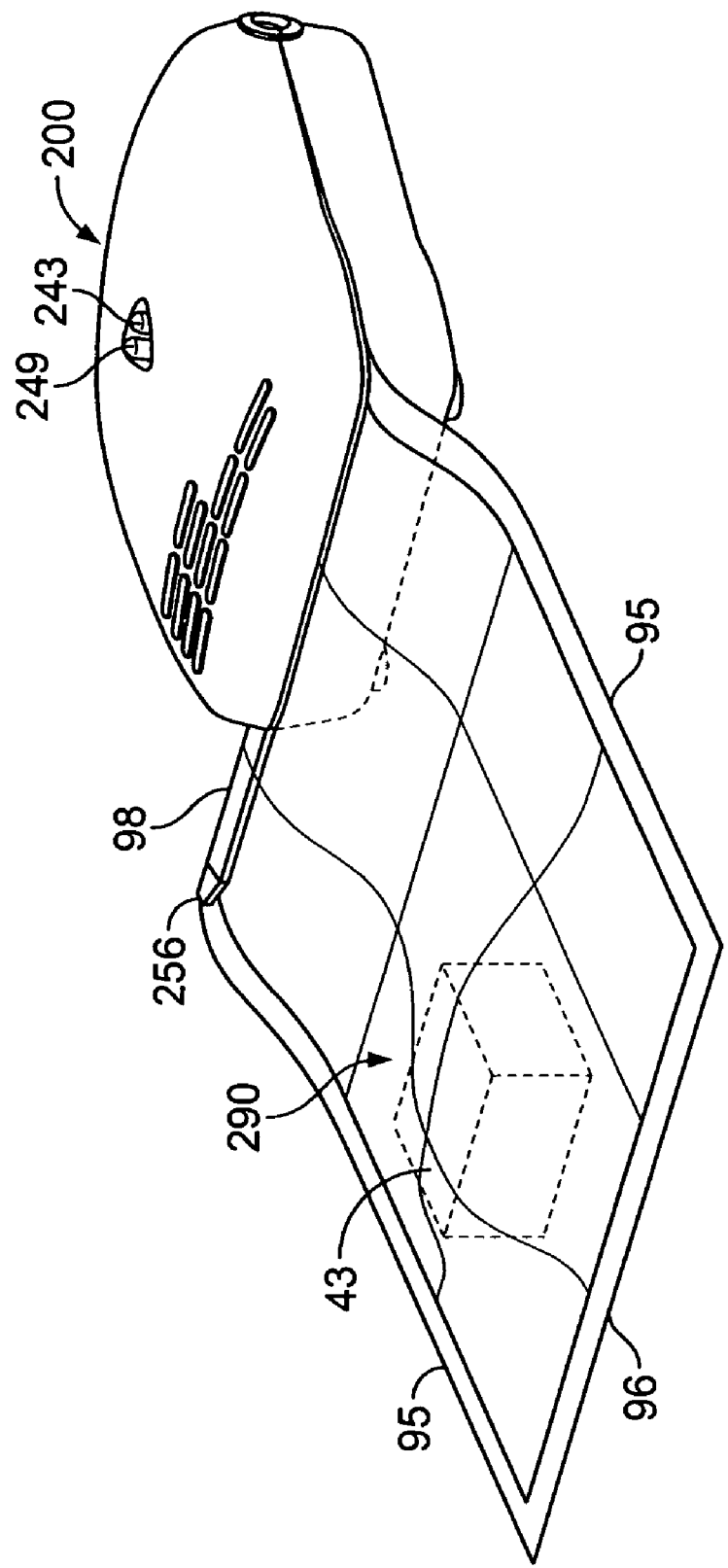
FIG. 16 is an isometric view of the bag and item of FIG. 14 during the sealing of the bag using the FIG. 12 embodiment.
Figure 17:
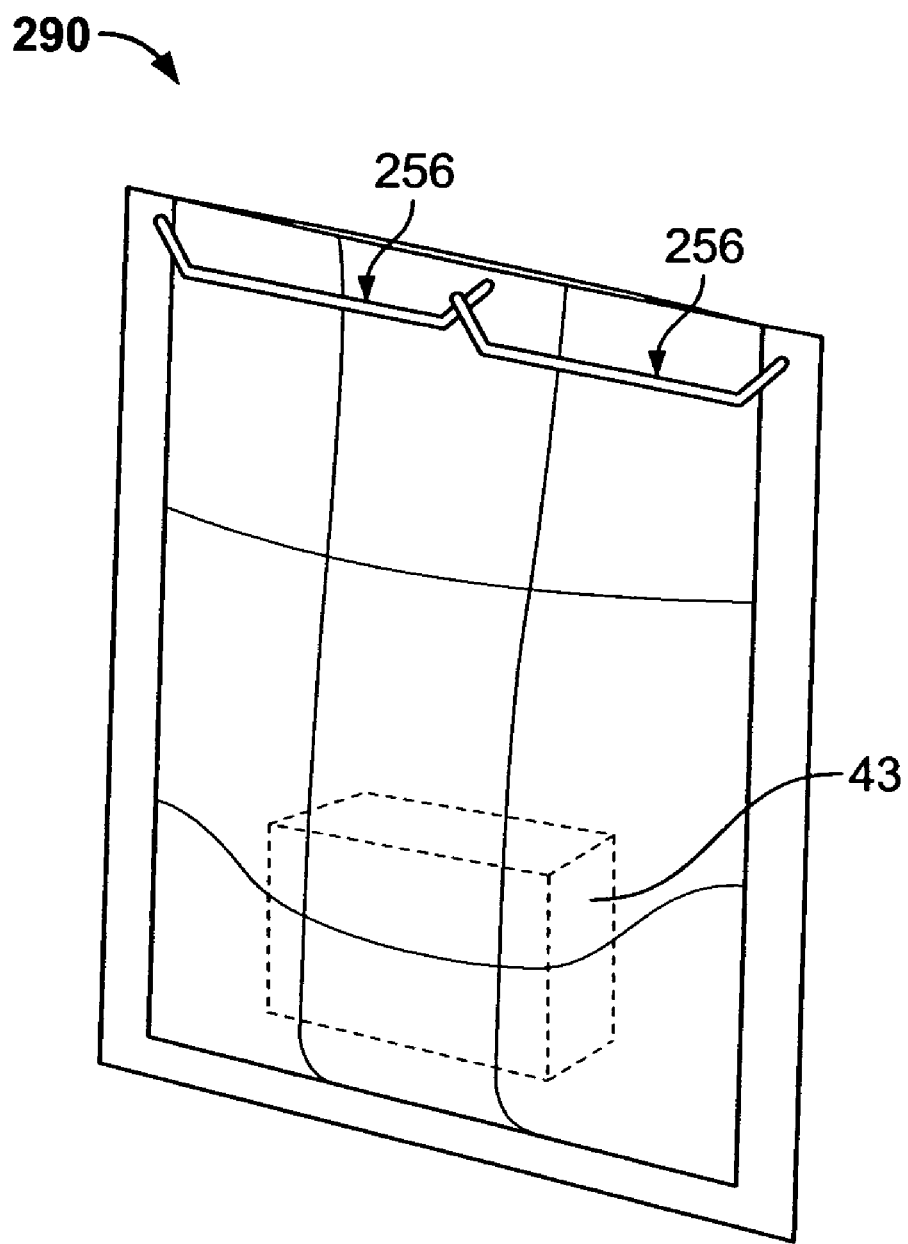
FIG. 17 is an isometric view of an item sealed in a bag resulting from sealing using the embodiment of FIG. 12.

Since the opening of the exemplary bag 290 is wider than the width of the bag sealer element 251, the bag seal 256 will not completely seal the bag 290 with only a single bag seal process and the bag 290 will have to undergo the bag sealing process again. The bag sealing process described above will be repeated placing the bag 290 in the bag sealing assembly 250 with the unsealed portion of the opening between the bag sealer element 251 and the bag sealing pressure pad 255 as depicted in FIG. 16. FIG. 17 depicts the item 43 sealed in the bag 290 after the bag 290 has been through the bag sealing process twice resulting in two bag seals 256. It should be noted that if the bag opening is smaller than the width of the bag sealer element 51, the bag sealing process would not need to be repeated. Also, if the bag opening is not completely sealed after the bag sealing process is repeated for a second time, the bag sealing process should be repeated again, as shown for example in FIG. 18. As is evident from the foregoing, the multi-function evacu-sealer 200 can seal bags with any size opening simply by shifting the bag 290 so that an unsealed portion of the opening is inserted in the bag sealing mechanism. An advantage of the multi-function evacu-sealer 200 is that the heat sealer does not need to be as big as the width of the bag.

Figure 18:
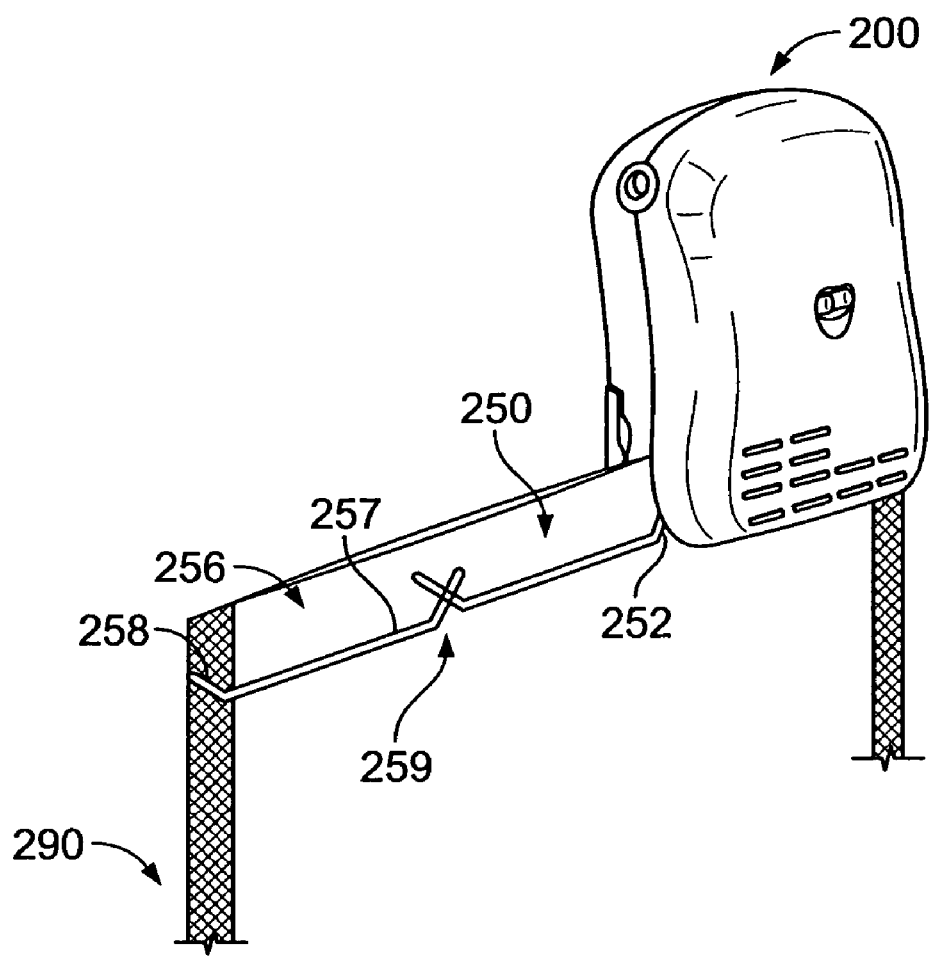
FIG. 18 is a perspective view of the clamp pattern resulting from the heat sealer of the embodiment of FIG. 12.
Figure 19A:
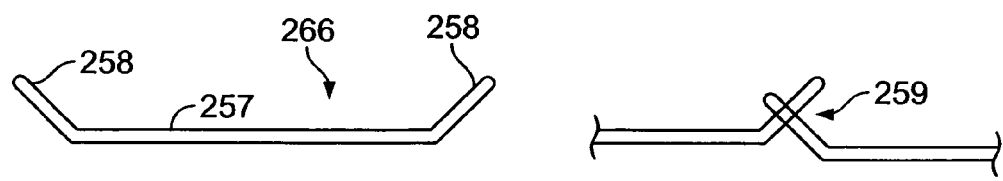
FIGS. 19A-D depict alternative bag seal and bag seal element configurations for use in sealing bags.
Figure 19B:
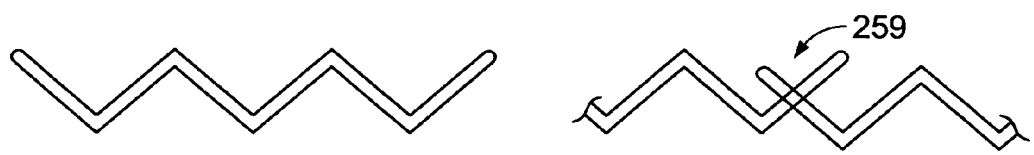
Figure 19C:
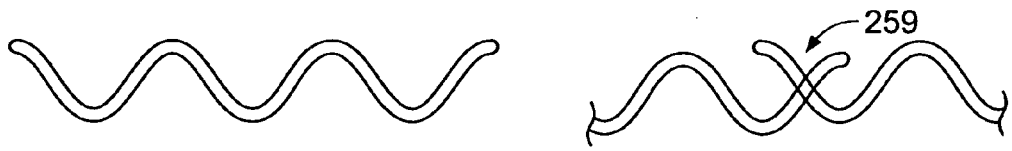
Figure 19D:

As is seen in FIGS. 17 and 18 the bag seal 256 is not linear. FIG. 19 shows preferred clamping patterns resulting from the heat sealing. The pattern shows that the heat sealing need not be positioned accurately to create a proper seal. Preferably the bag seal 256 comprises a bag seal body 257 and bag seal ends 258. As seen in FIG. 19a, while the bag seal body 257 may linear, the bag seal ends 258 are preferably not linear with respect to the bag seal body 257. This results in a bag seal overlap 258 when the bag sealing process is repeated without having to carefully line up the seals as would be the case if the bag seals were linear. The nonlinear bag seal 256 shapes are preferably achieved by forming the bag seal element 251 in the shape of the desired bag seal 256. FIG. 19b depicts a sawtooth bag seal 256 and bag seal element 251 shape and the resulting bag seal overlap 259. FIG. 19c depicts a sinusoidal bag seal 256 and bag seal element 251 shape and the resulting bag seal overlap 259. FIG. 19d depicts a single arched bag seal 256 and bag seal element 251 shape and the resulting bag seal overlap 259. Other heat seal wire configurations may be used. Such different configurations may include more than one heat seal wire that intersect or meet at a point (not shown).

Figure 20:
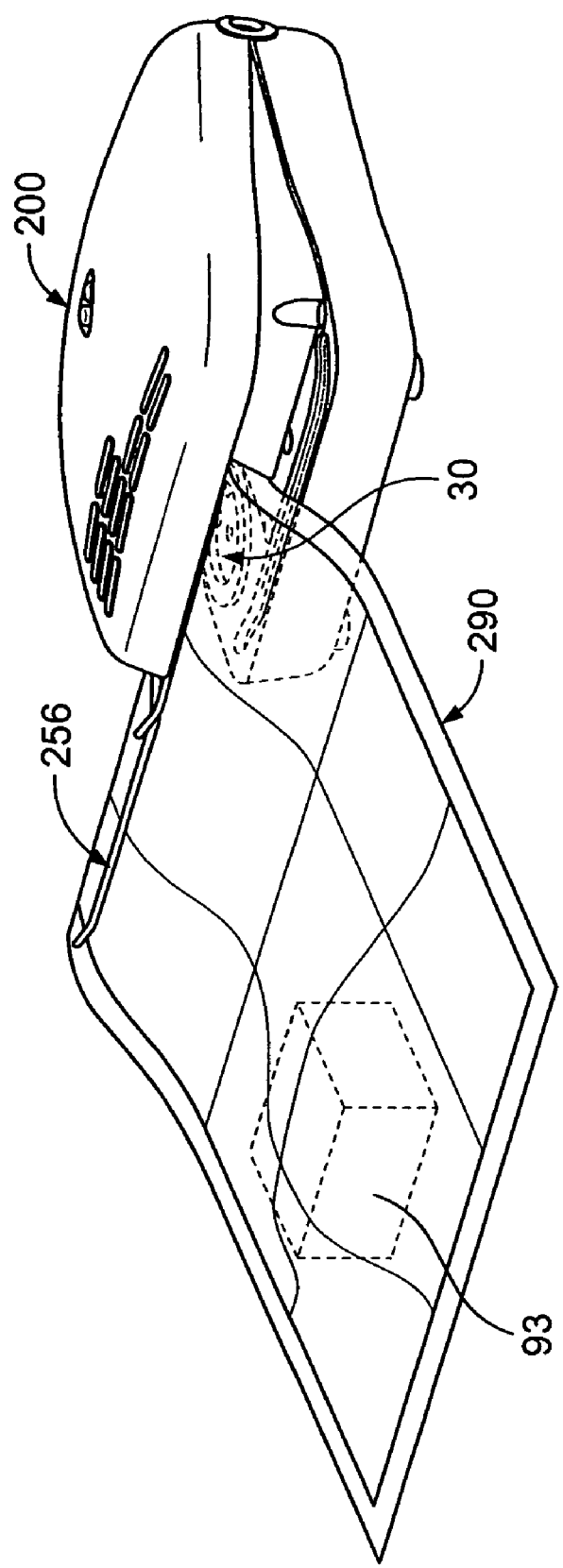
FIG. 20 is an isometric view of the bag and item of FIG. 17 in position to begin the evacuation of the bag using the FIG. 12 embodiment.
Figure 21:
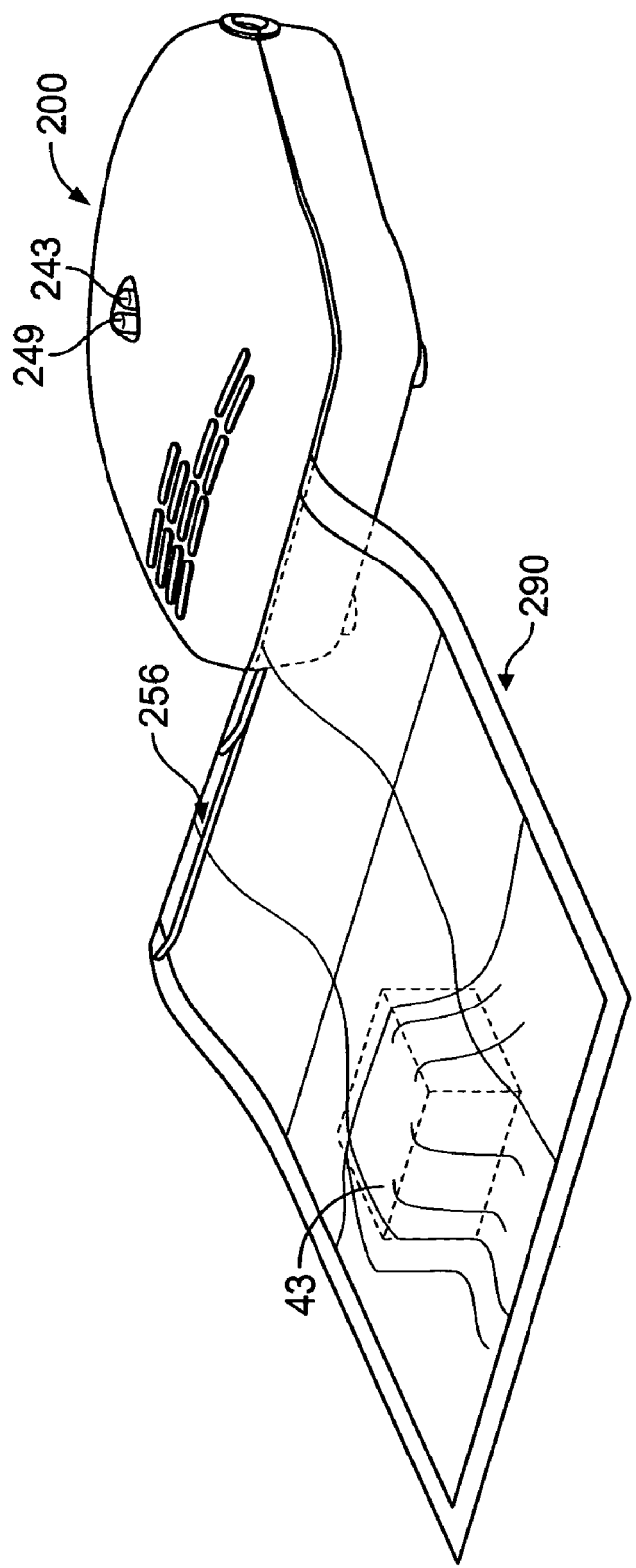
FIG. 21 is an isometric view of the bag and item of FIG. 17 during the evacuation of the bag using the FIG. 12 embodiment.

Once the bag 290 is sealed, the evacuation process can begin. Preferably the desired amount of the fluid, in this example air, is removed from the bag 290 using the evacu-sealer mechanism 50. As shown in FIG. 20, the sealed bag 290 is position between the lower sealing assembly 30 and the upper sealing assembly 20 (not shown) of the evacu-sealer mechanism 50. As the multi-function actuator 211 is moved to the closed position as described above with respect to the stand-alone evacu-sealer 10, both sides 91, 92 of the bag 290 are cut by a blade 26 (not shown) and the lid switch 265 is activated by lid switch actuator 264. The evacu-sealer mechanism 50 will be activated because the bag 290 is positioned over the evacu-sealer mechanism 50 which allows the vacuum sealer actuator 263 to contact the vacuum sealer position sensor 262 causing the evacuation of the fluid from the bag process to begin followed by the sealing of the evacuated bag processes. The methods for these processes explained above with regard to the stand-alone evacu-sealer 10 are the preferred methods for use with the multi-function evacu-sealer 200 since the evacu-sealer mechanism is preferably the same.

Although a drip tray is not shown, the multi-function evacu-sealer 200 preferably includes one. Preferably it is configured as a drawer on the side of the multi-function base 212 near the evacu-sealer mechanism 50 and functions in the same fashion as described with regard to the stand-alone evacu-sealer 10.

Figure 22:
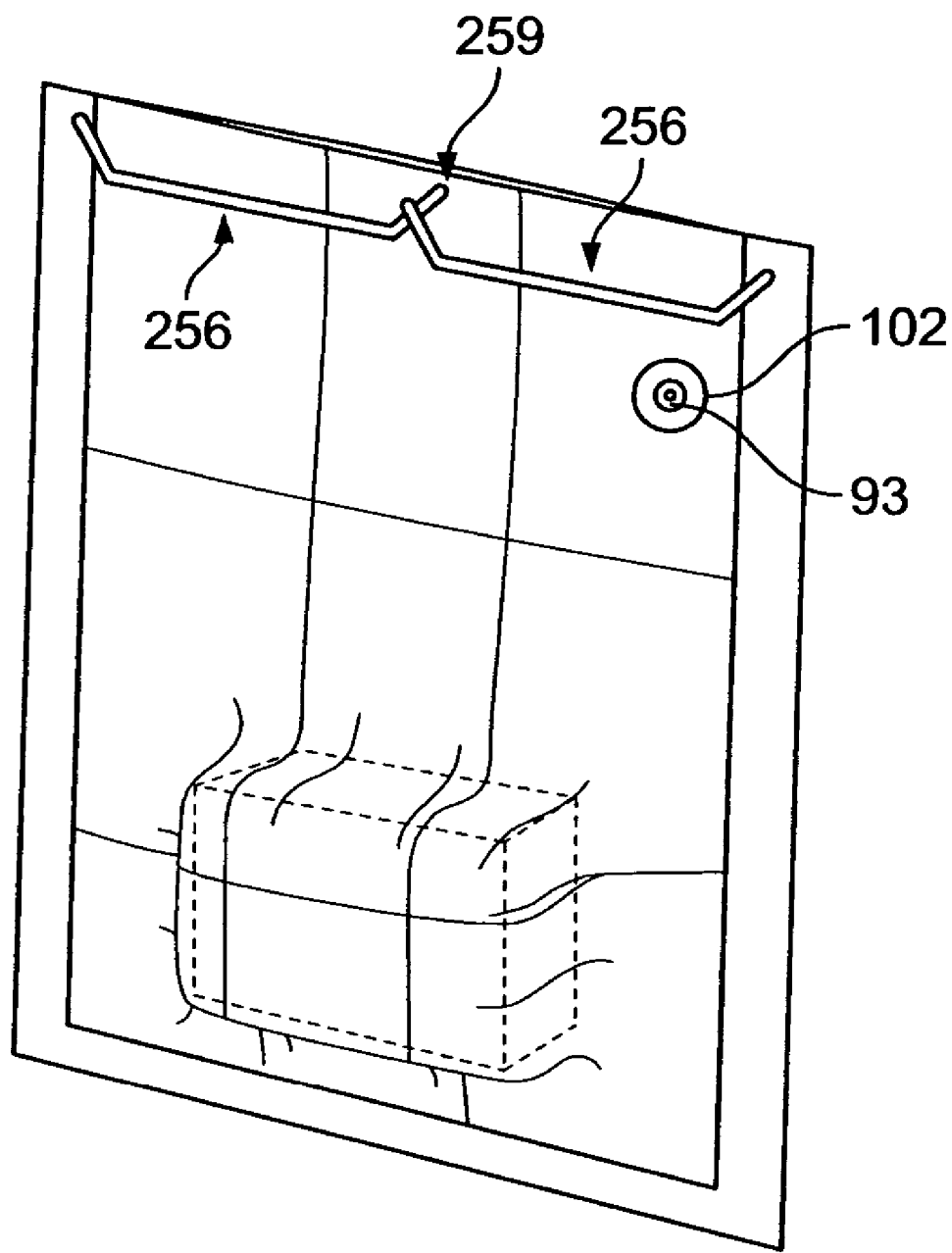
FIG. 22 is an isometric view of an item vacuum packed in a bag resulting from sealing and evacuating using the embodiment of FIG. 12.

A heat sealed vacuum package 270 is depicted in FIG. 22 and preferably includes an item 43 heat sealed in an evacuated nonreclosable bag 290 by one or more non-linear heat seals 256 with a seal overlap 259 and a donut seal 101. It should be understood that the use of the term "nonreusable" refers to the fact that if one wanted to reuse the bag, all or a portion of the bag heat seal 256 would have to be removed, making the volume of the bag smaller, and then resealed with a bag heat sealer. The difference being that when a reusable bag is reused, the volume does not change due to removing all or part of the heat seal 256, whereas with a nonreusable bag, reuse results in a decrease in volume of the bag due to removal of all or part of the heat seal 256.

Figure 23:
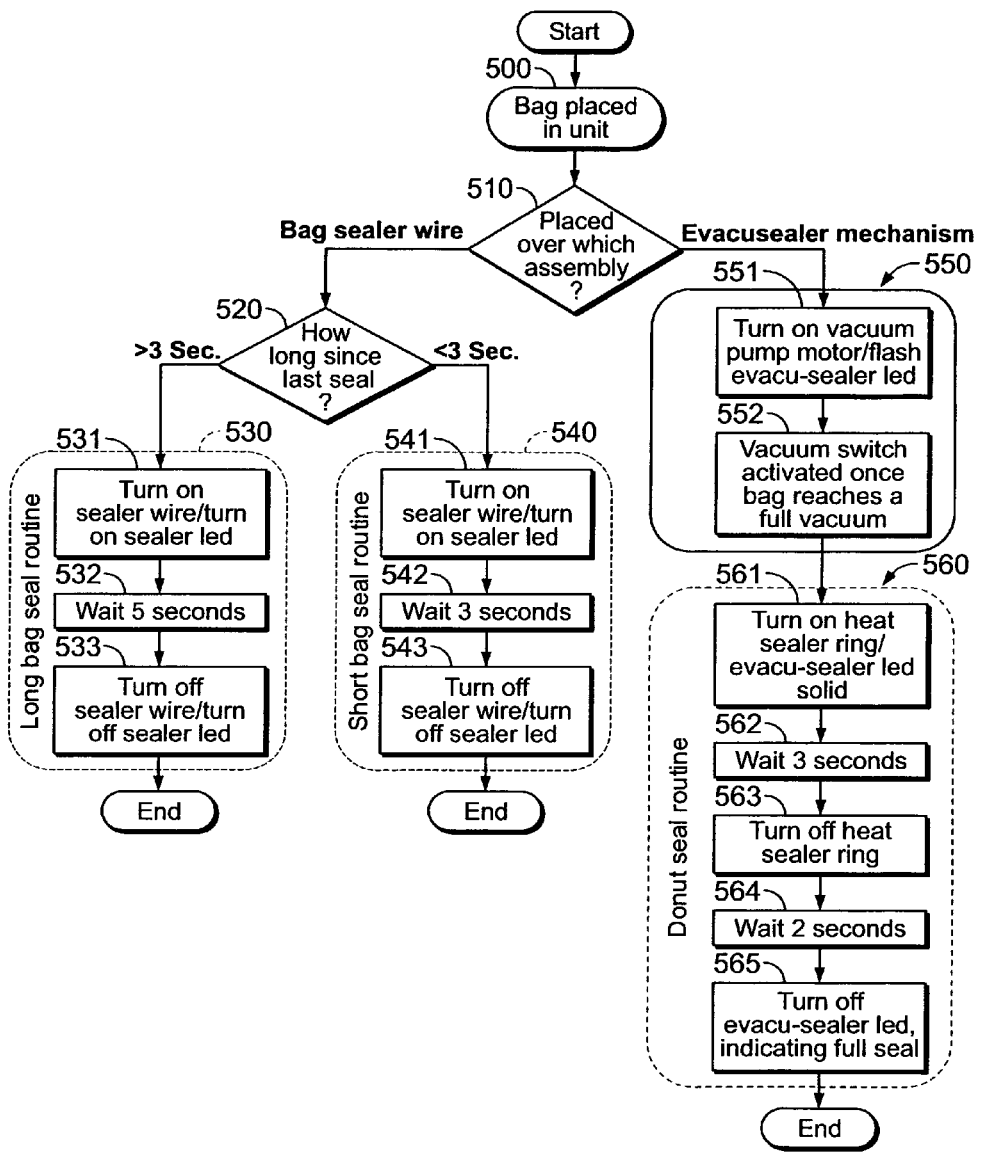
FIG. 23 is a logic flowchart of the preferred operation of the embodiment of FIG. 12.

FIG. 23 is a logic diagram of the preferred operation of the multi-function evacu-sealer. The process preferably starts with the placement of the bag in the in the unit 500. As the actuator is moved from the open to the closed position, the unit determines over which assembly the bag is placed 510. As explained above this is preferably accomplished through various function sensors. If the unit determines that bag is placed over the bag sealer wire assembly, the unit will determine how long it has been since the last sealing operation 520. If it has been more than three seconds since the last bag sealing operation the long bag seal routine 530 will be followed. If it has been less than three seconds since the last bag sealing operation the short bag seal routine 540 is followed.

The long bag sealing routine 530 preferably comprises turning on the bag sealer wire 251 and turning on the bag sealer indicator 243 (531); holding that condition for five seconds (532); and then turning off the bag sealer wire 251 and the bag sealer indicator 243(533). The short bag sealing routine 540 preferably comprises turning on the bag sealer wire 251 and turning on the bag sealer indicator 243(541); holding that condition for three seconds (542); and then turning off the bag sealer wire 251 and the bag sealer indicator 243(543). The reason for the difference in time between the two operations is because it takes a while for the bag sealer wire 251 to cool down. If the bag sealer wire 251 is still hot from the last seal, a five second sealing time could melt through the bag rather than sealing the two sides of the bag together.

If the unit determines that the bag is placed over the evacu-sealer mechanism 50, the vacuum pump routine 550 is commenced. The vacuum pump routine 550 preferably comprises turning on the vacuum pump motor and flashing the evacu-sealer indicator 244 (551) and when the bag has reached its desired vacuum the vacuum pressure switch is activated. After the vacuum pump routine 550 is completed, the donut seal routine 560 preferably commences. The donut seal routine 550 preferably comprises turning on the sealer wire and turning the evacu-sealer indicator 244 on steady (561); holding that condition for three seconds (562); turning off the sealer wire (563); holding that condition for two seconds (564); and, turning off the vacuum pump and the evacu-sealer indicator to alert the user that the donut seal routine 560 is complete (565).

The preferred logic functions depicted in FIG. 23 are preferably embodied in the unit through conventional hard-wired circuitry but can be implemented in through programmable chips, firmware or software.

Figure 24:
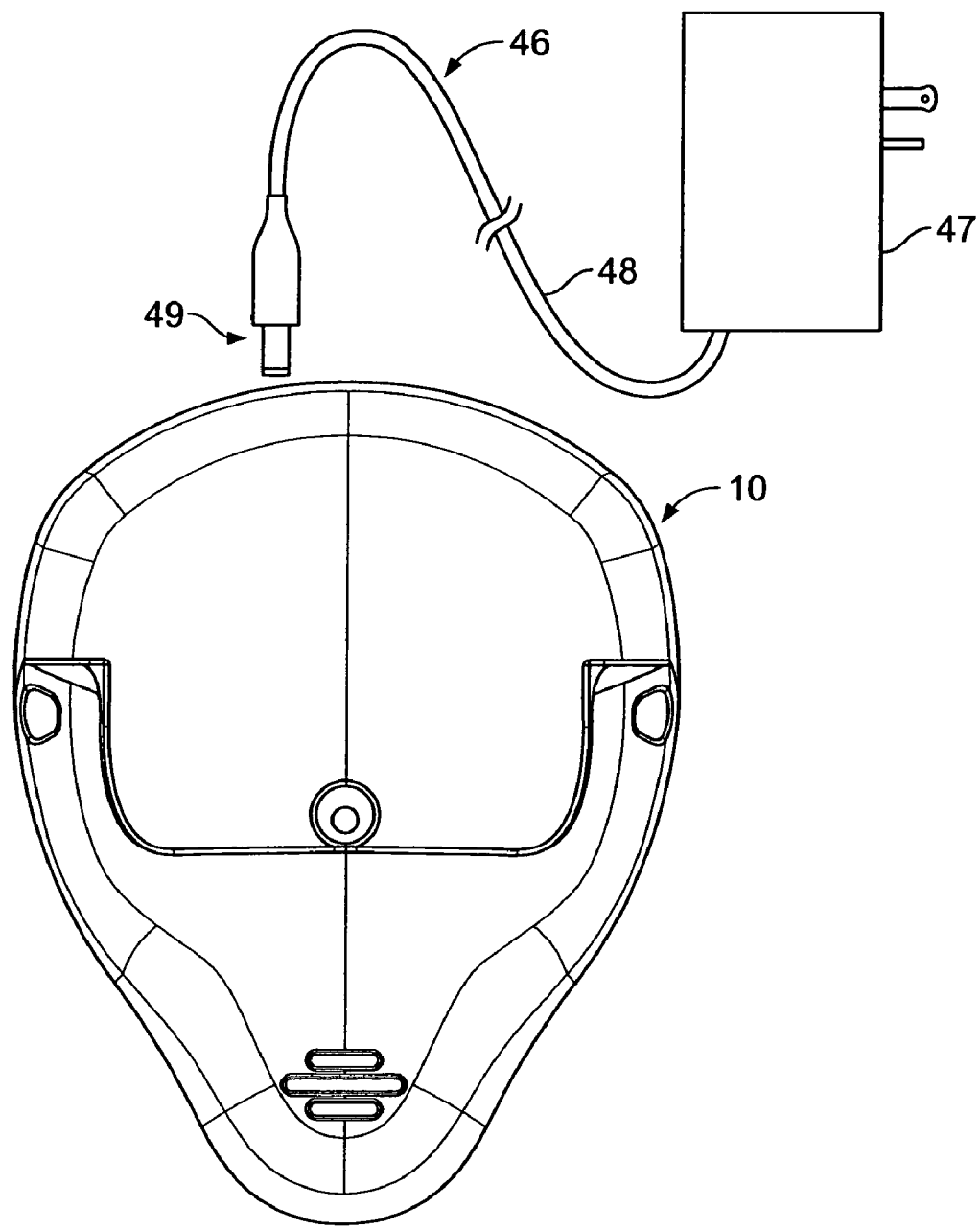
FIG. 24 is a top view of a plug-in embodiment of the FIG. 1 embodiment.

FIG. 24 depicts a plug-in embodiment of the stand-alone evacu-sealer 10. In this embodiment the power is supplied through a wall plug-in adapter 46 comprising a transformer 47, cord 48 and low voltage plug 49 assembly replacing the batteries. The transformer would reduce the voltage from 220v or 110v to 15v depending on the geographical usage of the evacu-sealer 10.

Figure 25:
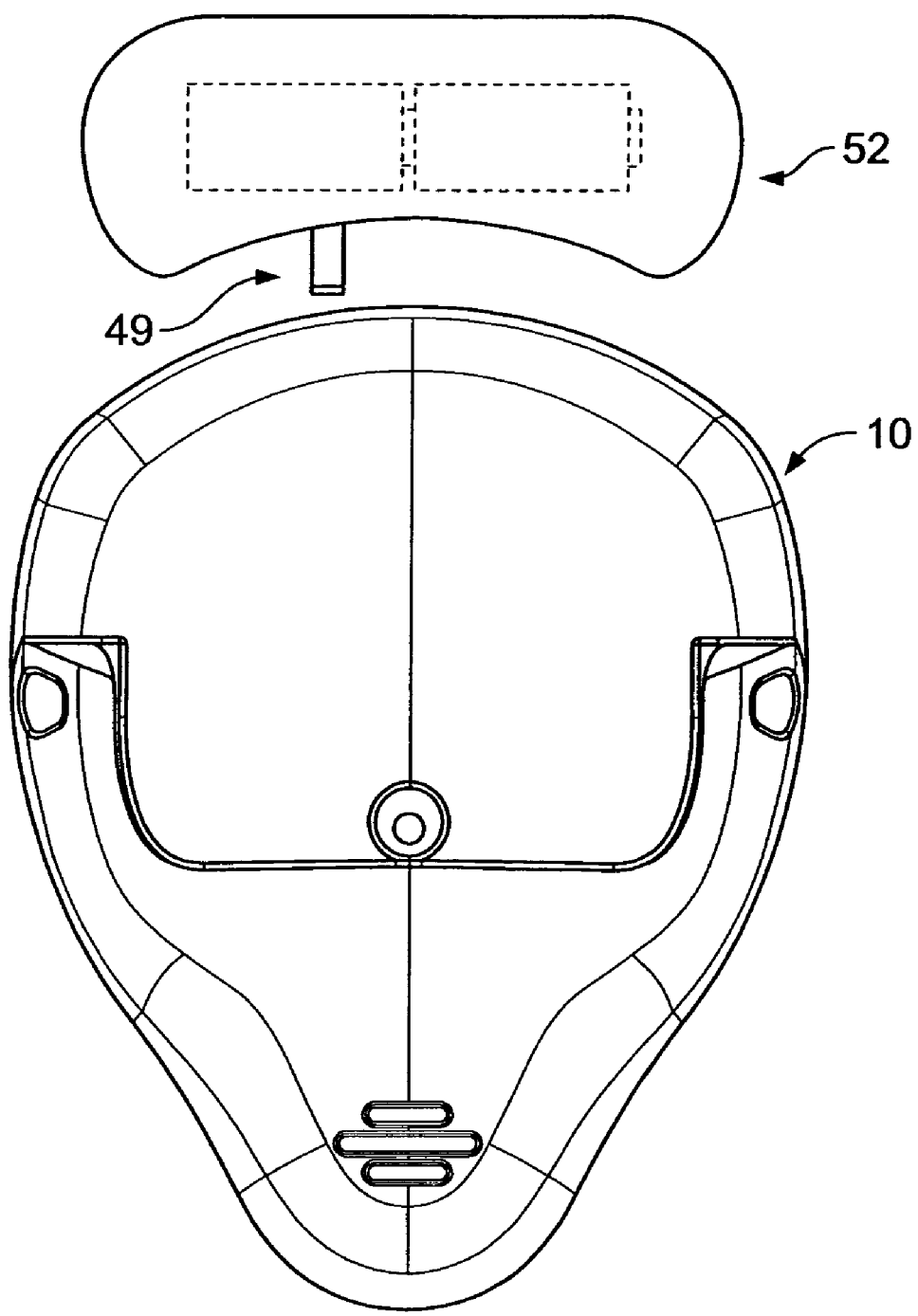
FIG. 25 is a top view of the plug-in embodiment with an external battery pack.

FIG. 25 depicts the plug-in embodiment of FIG. 24 where the power supply comprises and external battery pack 52 including the low voltage plug 49. In this embodiment the evacu-sealer can run off the external battery pack 52 or a standard wall socket. The external battery pack can be rechargeable or employ standard alkaline batteries that are replaced when exhausted.

Figure 26:
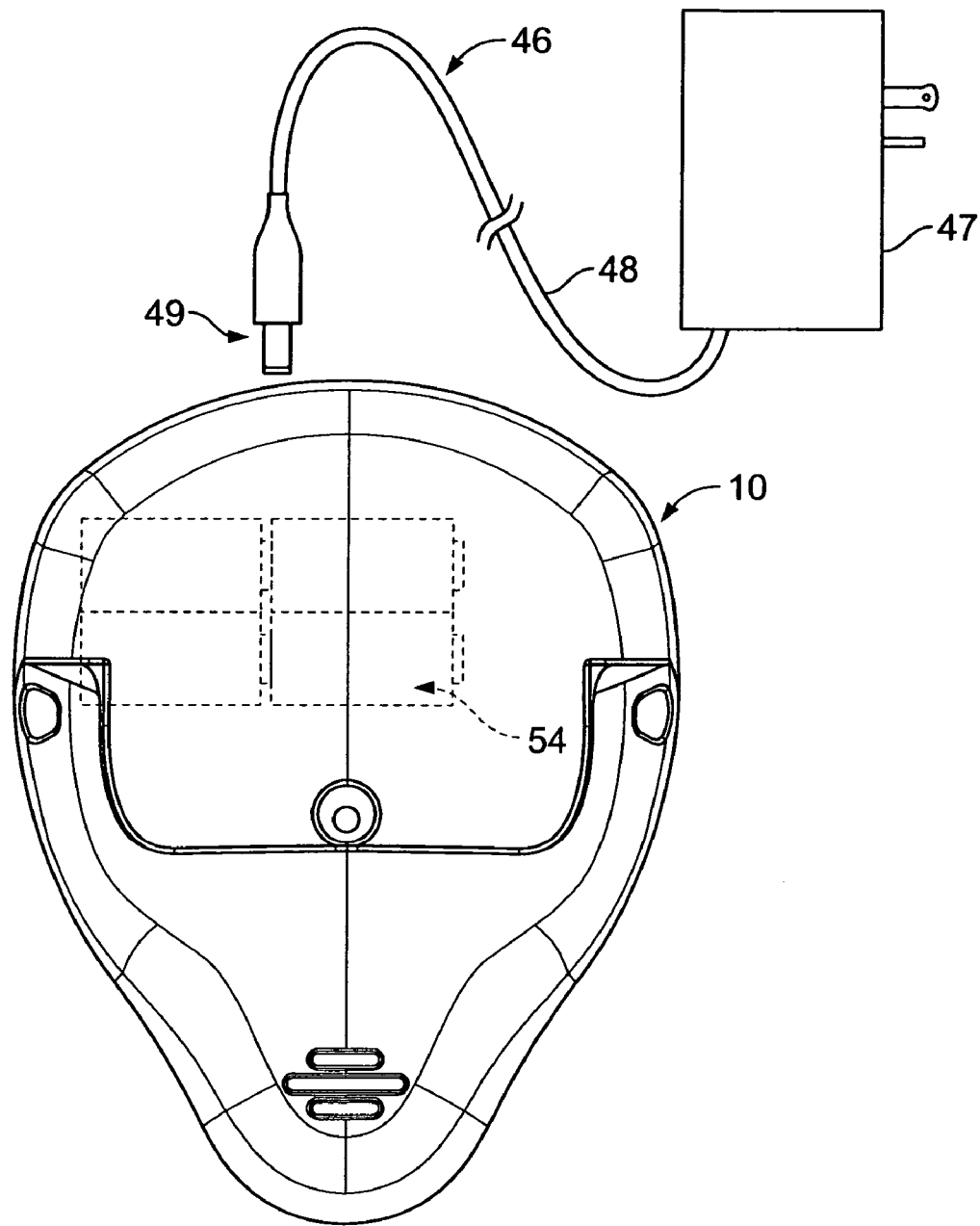
FIG. 26 is a top view of a rechargeable battery embodiment.

FIG. 26 depicts an alternative embodiment of the stand-alone evacu-sealer 10 comprising an internal rechargeable battery pack 54 as the power supply. The rechargeable battery pack 54 is recharged using the wall plug adapter 46. In this embodiment the evacu-sealer 10 can run plugged in a standard wall outlet or off the rechargeable battery pack 54.

Figure 27:
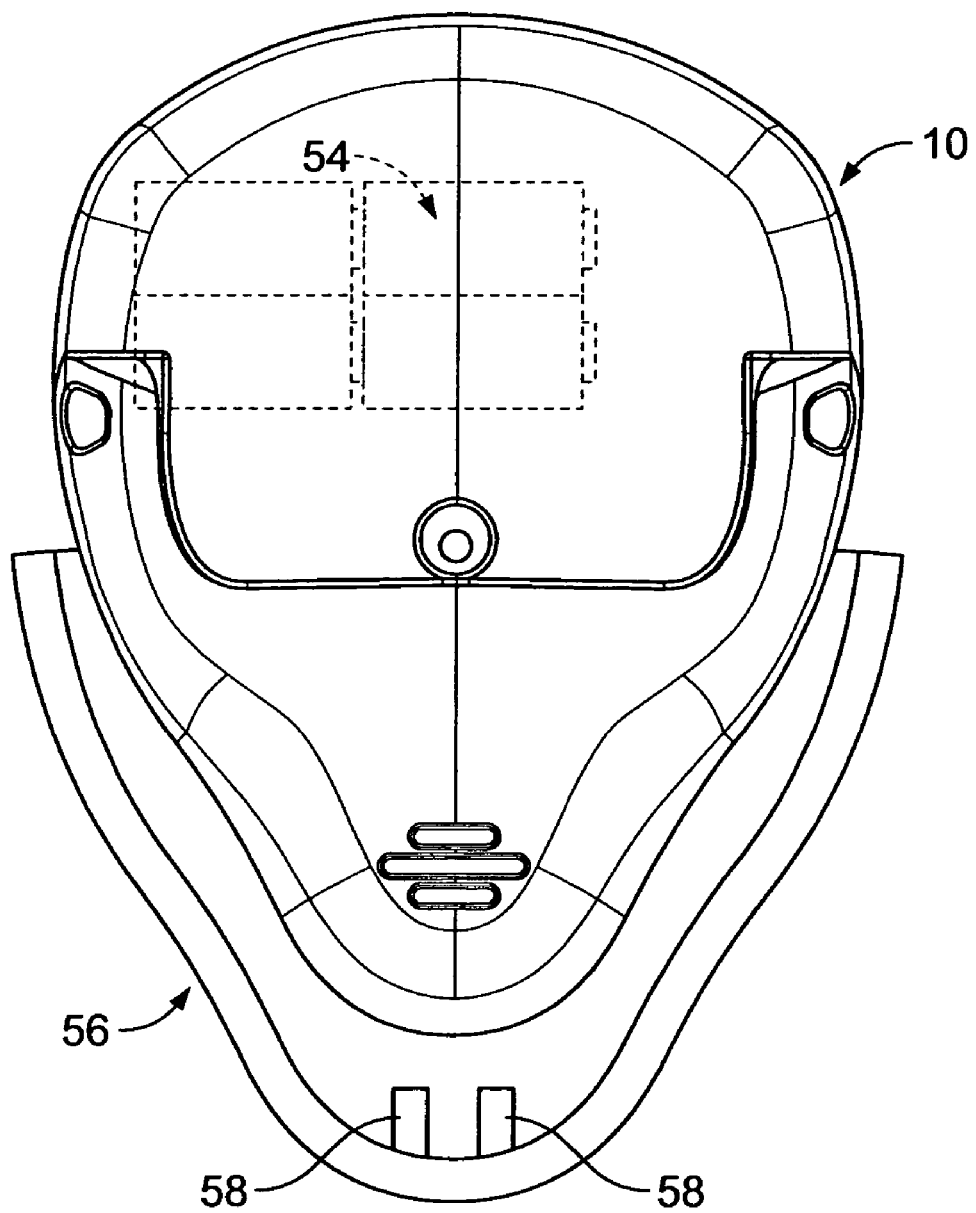
FIG. 27 is a top view of a rechargeable battery embodiment and wall mounted charging station.

FIG. 27 depicts a stand-alone evacu-sealer 10 powered by rechargeable batteries and a wall mounted recharging unit 56. The wall mounted recharging unit includes electrical contacts 58 that interface with reciprocal female sockets for charging the battery pack and a standard wall plug (not shown) for plugging into wall socket.

Each of the various different power supply embodiments described with regard to FIGS. 24-27 may be used with the multi-function evacu-sealer 200 described above and the compact multi-function evacu-sealer 300 described below.

Figure 28:
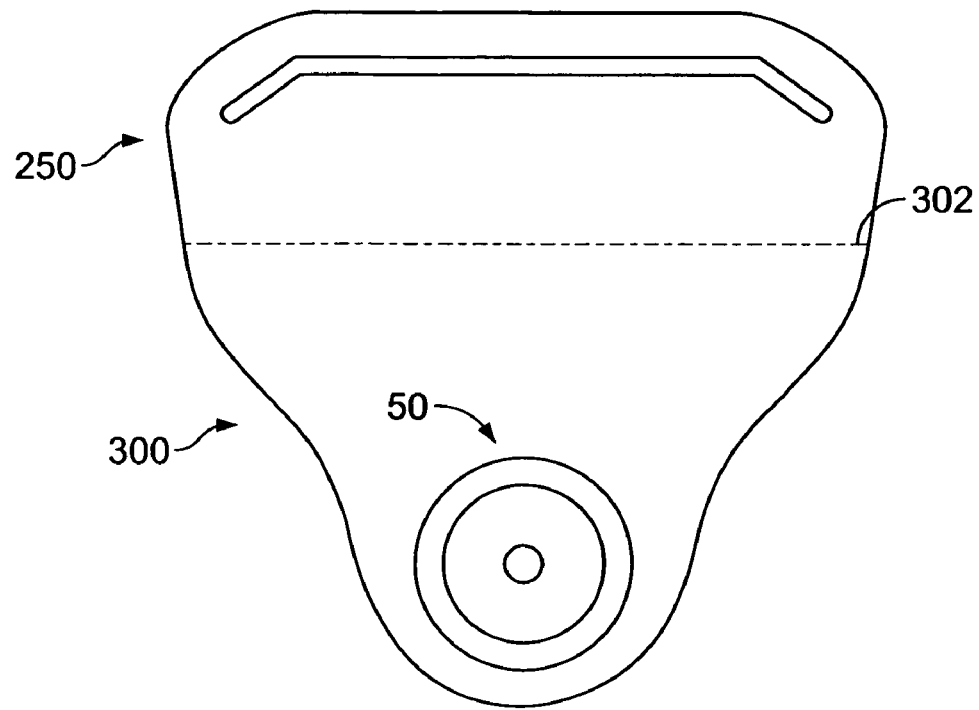
FIG. 28 is a top view of an alternative embodiment of the present invention diagrammatically depicting a non-linear heat sealer and an evacu-sealer device on opposite sides of a central hinge.

FIG. 28 depicts a compact multi-function evacu-sealer 300 without the actuators and other details for ease of understanding. This embodiment comprises an evacu-sealer mechanism 50 and a bag sealer assembly 250. In this embodiment the evacu-sealer mechanism 50 and bag sealer assembly 250 are on opposite ends of the compact multi-function evacu-sealer 300. The actuators of the evacu-sealer mechanism 50 and bag sealer assembly 250 (not shown) preferably share a common hinge 302. The compact multi-function evacu-sealer 300 is capable of performing the same functions and operating in the same fashion as the multi-function evacu-sealer 200 but is more compact.

Figure 29:
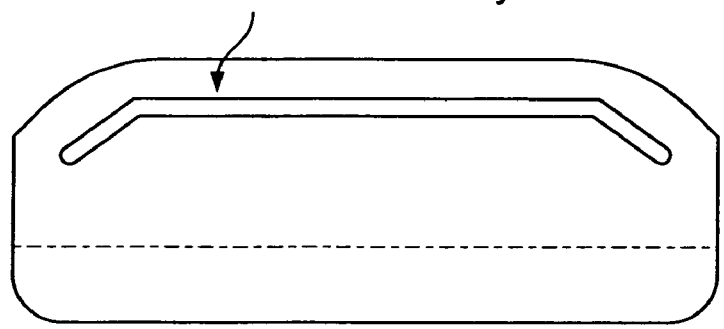
FIG. 29 is a top view of an embodiment of one aspect of the present invention incorporating only the non-linear heat sealer.

FIG. 29 depicts a stand-alone nonlinear bag sealer 280. The stand-alone nonlinear bag sealer 280 (depicted with the actuator removed) functions in the same fashion as the bag sealer assembly 250 of the multi-function evacu-sealer 200 and includes the components necessary to accomplish those functions.

Figure 30A:
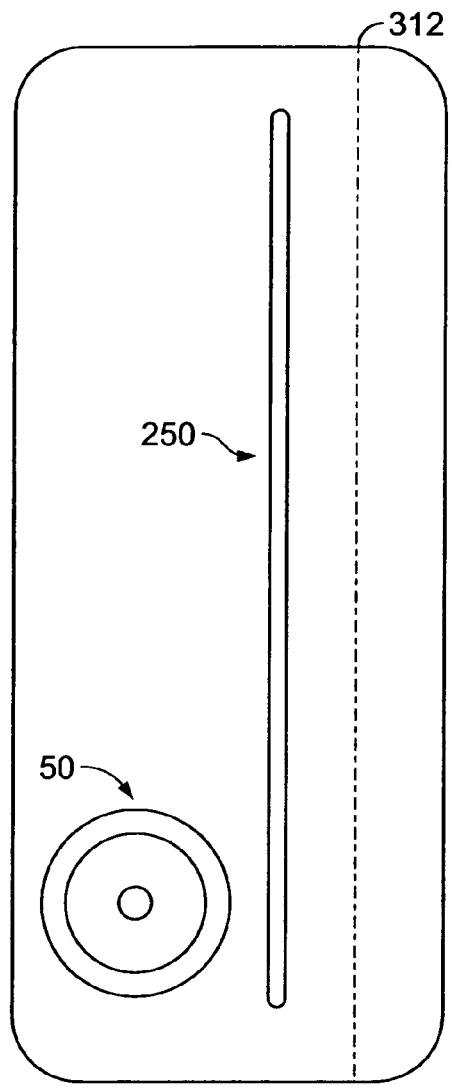
FIGS. 30A-C diagrammatically depict alternate locations of the evacu-sealer device assembly and a linear heat sealer in accordance with aspects of the present invention.
Figure 30B:
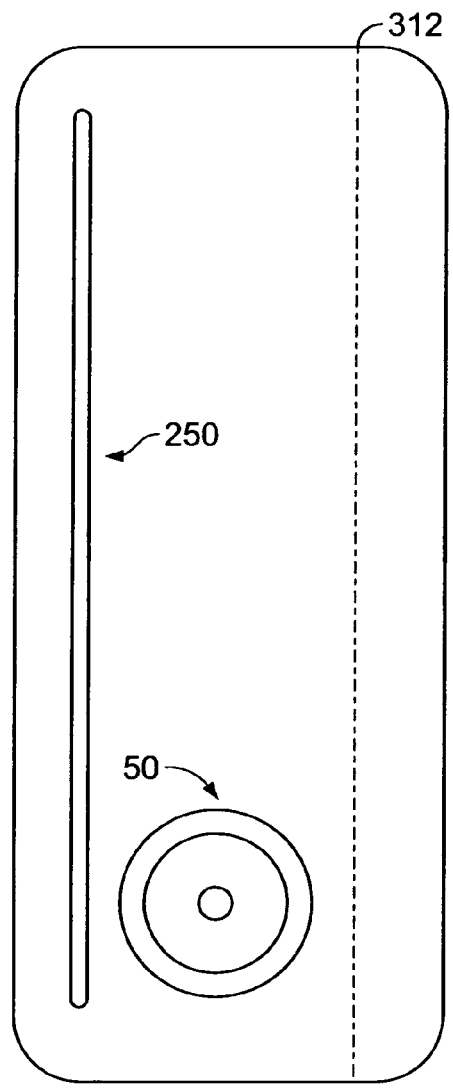

FIGS. 30A-B depict full bag width evacu-sealer 310 embodiments. The actuators are not shown to better illustrate the various arrangements of the bag sealer assembly 250 and the evacu-sealer mechanism 50. Each of these embodiments performs the same functions and the same operations as the multi-function evacu-sealer 200. Since the bag sealer assembly length exceeds the width of the bag to be used in the vacuum package the seal wire can be straight since there are no alignment issues. If desired however, the seal wire could be nonlinear. In the full bag width evacu-sealer 310 depicted in FIG. 30A the evacu-sealer mechanism 50 is forward of the bag sealer assembly 250. In other words the bag sealer assembly 250 is closer to the hinge 312. This allows an item to be vacuum-packed with only a single placement of the bag. For example with reference to the logic diagram of FIG. 23, after either the long bag seal routine 530 or short bag seal routine 540, the unit would proceed to the vacuum package routine 550 followed by the donut seal routine 560 without having to move the bag.

Figure 30C:
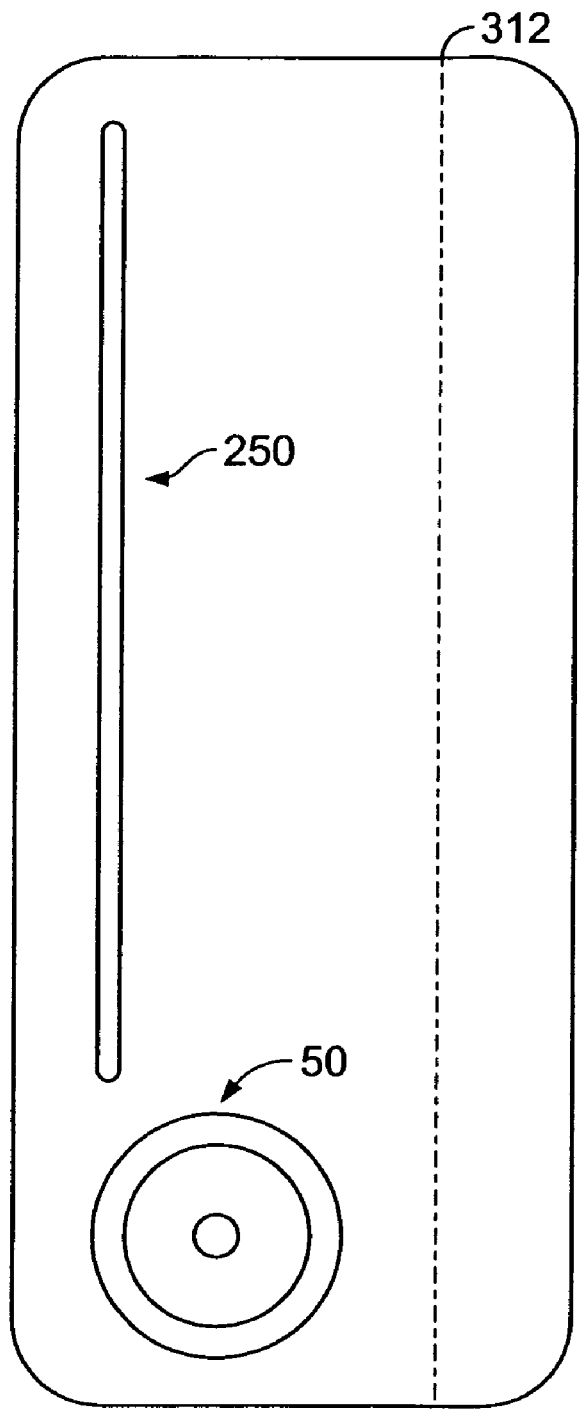

The full bag width evacu-sealer 310 depicted in FIG. 30B shows the evacu-sealer mechanism closer to the hinge 312 than the bag sealer assembly 250. In this embodiment the bag would be sealed, the actuator lifted and then the bag would be shifted towards the hinge 312. Appropriately placed function position sensors would control the operation of the various functions as described above with regard to the multi-function evacu-sealer 200. The full bag width evacu-sealer 310 in FIG. 30C has the evacu-sealer mechanism 50 in-line with the bag sealer assembly 250 requiring the bag to be shifted to the right or the left after the sealing operations are complete depending on the whether the evacu-sealer mechanism 50 is to the right or left of the bag sealer assembly 250.

Figure 31:
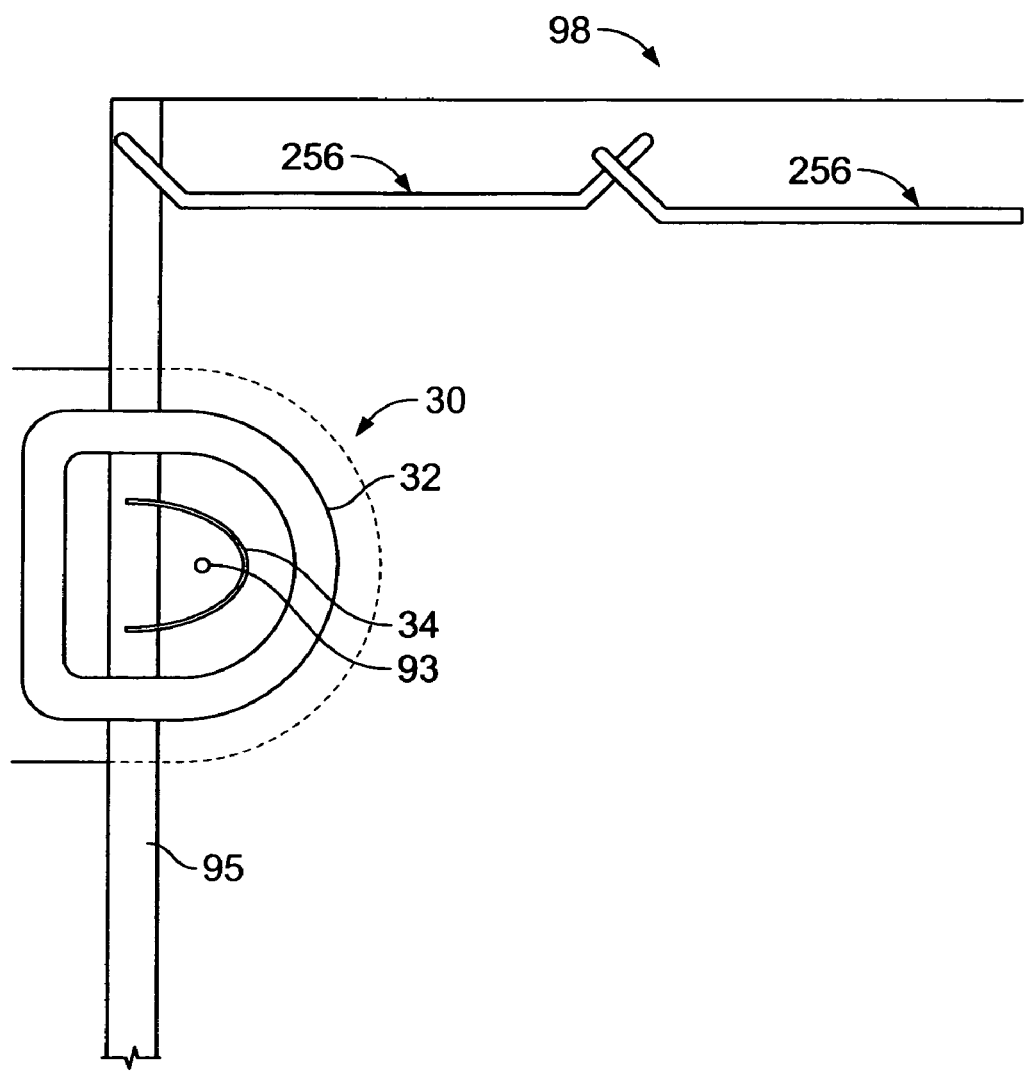
FIG. 31 depicts an alternative evacu-sealer device embodiment in accordance with aspects of the present invention.

FIG. 31 depicts an alternative configuration of the seal between the cut and the evacuated bag. In this embodiment only the lower sealing assembly is shown with a bag in position for evacuating and sealing. In this embodiment preferably the upper (not shown) and lower sealer assembly gaskets 32 are D-shaped and the heat seal wire 34 is u-shaped. During the evacuation and sealing operations the bag edge 95 or bottom (not shown) are placed such that the u-shaped seal wire 34 overlaps the edge seals.

Figure 32A:
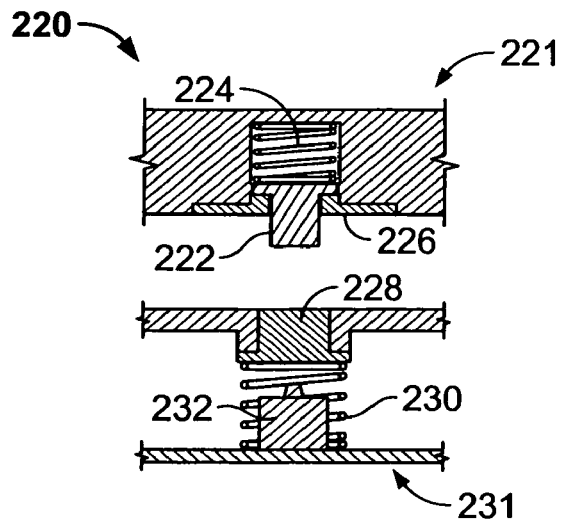
FIGS. 32A-C depict a preferred bag detector switch in accordance with aspects of the present invention.
Figure 32B:
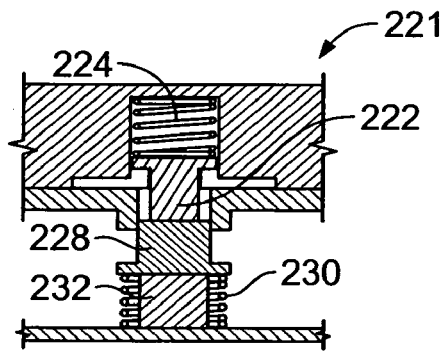
Figure 32C:
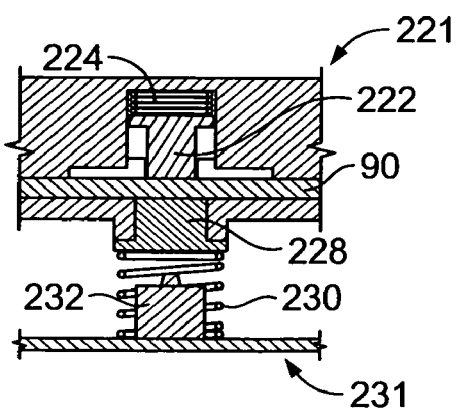

FIG. 32A-C depicts the operation of preferred bag detector 220 that can be used for detecting the presence of a bag under the actuator. FIG. 32A depicts the bag detector 220 with the actuator open. FIG. 32B depicts the bag detector 220 with the actuator in the closed position without a bag. FIG. 32C depicts the bag detector 220 with the actuator in the closed position with a bag 90. Preferably the bag detector 220 comprises male bag switch assembly 221 and a female bag switch assembly 231. Preferably the bag switch male assembly 221 comprises a bag switch depressor 222 and bag switch depressor spring 224 and is mounted in the actuator and held in place by bag switch retaining ring 226. Preferably the female bag switch assembly 231 comprises a bag switch piston 228, a bag switch piston spring 230 and a bag switch 232 and is mounted in the base. Preferably the bag switch depressor spring 224 has a higher spring constant K than the bag switch piston spring 230 in that the bag switch depressor spring 224 requires more force to compress than the bag switch piston spring 230.

In operation, when there is no bag between the base and the actuator and the actuator is in the closed position as depicted in FIG. 32B, because the bag switch depressor spring 224 is stronger than the bag switch piston spring 230, the male bag switch assembly 221 pushes against the bag switch piston 228 which pushes against the bag switch piston spring 230, allowing the bag switch piston 228 to depress the bag switch 232 causing it to change state.

When a bag is present as depicted in FIG. 32C, the bag acts as a barrier causing the bag switch depressor 222 to compress the bag switch depressor spring 224 and preventing the bag switch depressor 222 from pushing the bag switch piston 228 against the bag switch 232. The bag switch depressor spring 224 preferably has a spring constant that is low enough so that it will not push through the bag 90, but high enough to depress the bag switch piston spring 230 when the bag 90 is not between the actuator and the base.

The bag switch 232 can be either normally open or normally closed depending on the desired operation. Preferably the bag switch male assembly 221 is used for the bag sealer actuator 261 and the vacuum sealer actuator 263 and the bag switch female assembly 231 is used for the bag sealer position sensor 260 and the vacuum sealer position sensor 262 in the previously described embodiments.

Figure 33A:
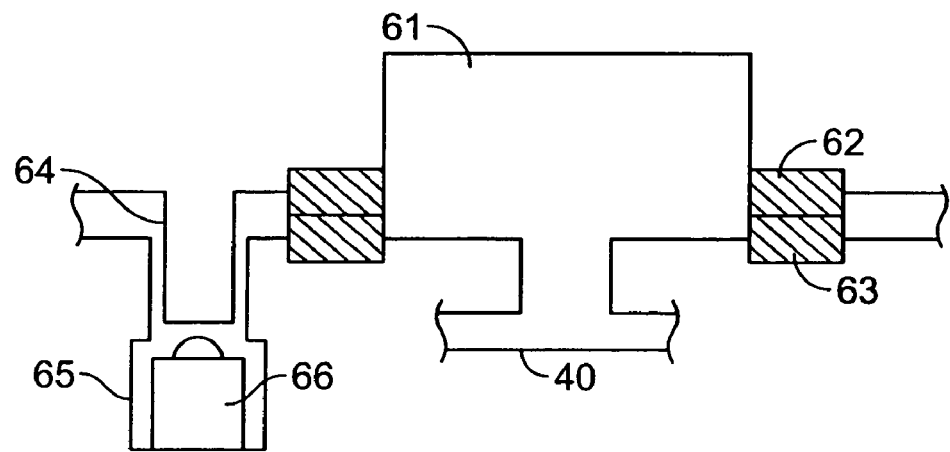
FIGS. 33A-B depict a preferred vacuum detection switch in accordance with aspects of the present invention.
Figure 33B:
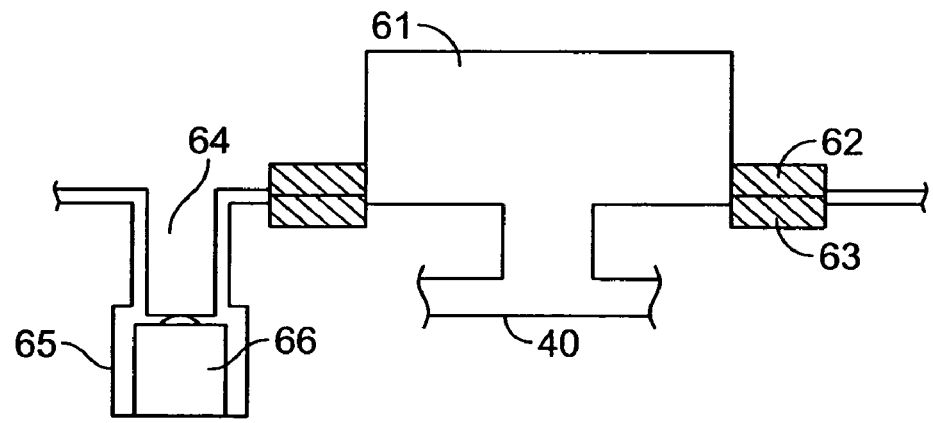

A preferred vacuum pressure switch 39 is depicted in FIGS. 33A and 33B. Preferably a pressure switch vacuum chamber 61 is connected in parallel with the vacuum hose 40. The pressure switch chamber 61 is formed when the actuator is in the closed position in that a part of the chamber is formed in the actuator and part is formed in the base. Two vacuum chamber gaskets 62 and 63 seal the pressure switch vacuum chamber 61. Preferably the vacuum chamber gaskets are of a low durometer neoprene material, the durometer dictated by the amount of vacuum desired in the container being evacuated. A vacuum switch depressor 64 is preferably mounted on the actuator and aligned with a mating opening 65 in the base. A vacuum detection microswitch 66 is preferably mounted in the opening 65 in such a manner that (1) when the actuator is in the closed position and the desired amount of vacuum has not been achieved in the container being evacuated, the vacuum switch depressor 64 does not contact the vacuum detection microswitch 66 and (2) when the actuator is in the closed position and the desired amount of vacuum has been achieved in the container being evacuated the vacuum switch depressor 64 contacts the vacuum detection microswitch 66 causing it to change state. Since the vacuum chamber gaskets 62, 63 are made of a low durometer neoprene, when the desired amount of vacuum is achieved in the bag, the air in the vacuum chamber 61 will be evacuated causing the vacuum chamber gaskets 62, 63 to compress, allowing the actuator to become more tightly closed and causing the vacuum switch depressor 64 to contact the vacuum detection microswitch 66.

In another alternative, the vacuuming unit can be designed in such a way that it interacts with the bag only from one side, preferably by eliminating the actuator. In this configuration, one side of the bag 90 would be pressed against a smooth flat surface, for example a kitchen counter top. The base would include the lower sealing mechanism 30 and also preferably the upper sealing mechanism 20 combined as a single mechanism.

Persons skilled in the art will understand that many variations of the present invention are possible. Therefore, the present invention should not be limited to the description of the preferred embodiments contained herein.

We claim as follows:

1. A method for forming a vacuum package comprising
sealing an item in a container to form a standalone sealed container in that the standalone sealed container will remain sealed in the absence of any external sealing mechanism, wherein the sealed container comprises at least one area with two opposing sides;
evacuating the sealed container by making a cut through each of the two sides of the sealed container and evacuating the desired volume of air from the sealed container; and
sealing the evacuated container by forming a seal between the two sides so that the cut in each side is sealed off from the rest of the interior of the container.

2. A method for forming a vacuum package comprising:
placing an item in a container wherein the container is a bag comprising a reclosing mechanism, and wherein the container comprises at least one area with two opposing sides;
closing the reclosing mechanism to form a sealed container containing the item;
evacuating the sealed container by making a cut through each of the two sides of the container and evacuating the desired volume of air from the container; and sealing the evacuated container by forming a seal between the two sides so that the cut in each side is sealed off from the rest of the interior of the container.

3. The method of claim 2 wherein the seal formed by sealing the evacuated container is a seal that completely surrounds the cut.

4. The method of claim 2 wherein the sealing of the evacuated container is accomplished through a thermal seal.

5. A method for creating a vacuum-sealed package comprising placing an item to be vacuum packed in a container; sealing the container with the item to be vacuum packed inside the container, placing a portion of the container in contact with a sealable chamber after having sealed the container with the item to be vacuum packed inside the container; sealing the chamber after placing a portion of the container in contact with the sealable chamber, creating holes in the container after sealing the chamber, evacuating the desired amount of air from the container after creating holes in the container and creating a seal between the interior of the container and the holes after evacuating the desired amount of air from the container.

* * * * *